(12) United States Patent (10) Patent No.: US 7,546,389 B2
Kouda (45) Date of Patent: Jun. 9, 2009

(54) METHOD AND APPARATUS FOR PROCESSING INFORMATION AND COMPUTER PROGRAM

(75) Inventor: Michitomo Kouda, Tokyo (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 11/366,589

(22) Filed: Mar. 3, 2006

(65) Prior Publication Data

US 2006/0202996 A1 Sep. 14, 2006

(30) Foreign Application Priority Data

Mar. 8, 2005 (JP) ............................. 2005-064334

(51) Int. Cl.
*G06F 3/00* (2006.01)
(52) U.S. Cl. ............................. 710/16; 710/8; 710/15; 710/19; 709/220; 709/221; 709/222; 717/174; 717/178
(58) Field of Classification Search ....................... None
See application file for complete search history.

(56) References Cited

U.S. PATENT DOCUMENTS 7,185,014 B1* 2/2007 Hansen ........................ 707/10

2003/0069720 A1* 4/2003 Zhang et al. .................... 703/7
2006/0101449 A1* 5/2006 Gatz ........................... 717/168

FOREIGN PATENT DOCUMENTS

| JP | 2002-281356 | 9/2002 |
|----|-------------|--------|
| JP | 2003-016006 | 1/2003 |
| JP | 2004-185235 | 7/2004 |
| JP | 2004-186941 | 7/2004 |

\* cited by examiner

*Primary Examiner*—Eron J Sorrell
(74) *Attorney, Agent, or Firm*—Oblon, Spivak, McClelland, Maier & Neustadt, P.C.

(57) ABSTRACT

An information processing apparatus for communicating with another information processing apparatus that stores model-based product model information relating to a predetermined product model, includes a first storage for storing a model code uniquely identifying the product model of the information processing apparatus, a second storage for storing product model information relating to the product model of the information processing apparatus, a connector for connecting the information processing apparatus with the other information processing apparatus, and a communication controller for controlling the communication between the information processing apparatus and the other information processing apparatus as a connection destination of the connector.

4 Claims, 24 Drawing Sheets

FIG. 2

■ IMPORTANT INFORMATION

DEFECT INFORMATION OF THIS MODEL:
    CURRENTLY NO INFORMATION FOR THIS PRODUCT

■ RECENTLY RECEIVED INFORMATION
FOR USE OVERSEAS:
    THIS MODEL CAN WORK UP TO 220 VAC SUPPY OVERSEAS

FIG. 5

| | | |
|---|---|---|
| 0 | 0x0300 | 0000001100000000 |
| 1 | 0x0300 | 0000001100000000 |
| 2 | 0x3FFC | 0011111111111100 |
| 3 | 0x3FFC | 0011111111111100 |
| 4 | 0x0600 | 0000011000000000 |
| 5 | 0x07F0 | 0000011111110000 |
| 6 | 0x0FFC | 0000111111111100 |
| 7 | 0x1E6E | 0001111001101110 |
| 8 | 0x3667 | 0011011001100111 |
| 9 | 0x36E3 | 0011011011100011 |
| A | 0x66C3 | 0110011011000011 |
| B | 0x63C3 | 0110001111000011 |
| C | 0x7387 | 0111001110000111 |
| D | 0x3F0E | 0011111100001110 |
| E | 0x1C3C | 0001110000111100 |
| F | 0x0038 | 0000000000111000 |

| MODEL NAME | SELECTED LANGUAGE | MODEL CODE TO BE TRANSMITTED | DISPLAY FILE OF CORRESPONDING "UPDATE INFORMATION" |
|---|---|---|---|
| DSC-P72 | JP (JAPANESE)<br>EN (ENGLISH)<br>GE (GERMAN)<br>CH (CHINESE) | P072JP<br>P072EN<br>P072GE<br>P072CH | p072jp.jpg<br>p072en.jpg<br>p072ge.jpg<br>p072ch.jpg |
| DSC-P100 | JP (JAPANESE)<br>EN (ENGLISH)<br>GE (GERMAN)<br>CH (CHINESE) | P100JP<br>P100EN<br>P100GE<br>P100CH | p100jp.jpg<br>p100en.jpg<br>p100ge.jpg<br>p100ch.jpg |
| DSC-M1 | JP (JAPANESE)<br>EN (ENGLISH)<br>... | M001JP<br>M001EN<br>... | m001jp.jpg<br>m001en.jpg<br>... |
| DSC-F828 | JP (JAPANESE)<br>EN (ENGLISH)<br>GE (GERMAN)<br>CH (CHINESE) | F828JP<br>F828EN<br>F828GE<br>F828CH | f828jp.jpg<br>f828en.jpg<br>f828ge.jpg<br>f828ch.jpg |

FIG. 18

| MODEL NAME | SELECTED LANGUAGE | MODEL CODE TO BE TRANSMITTED | "UPDATE INFORMATION" DISPLAYING FILE | "UPDATE INFORMATION" TEXT FILE |
|---|---|---|---|---|
| DSC-P72 | JP (JAPANESE)<br>EN (ENGLISH)<br>GE (GERMAN)<br>CH (CHINESE) | P072JP<br>P072EN<br>P072GE<br>P072CH | p072jp.jpg<br>p072en.jpg<br>p072ge.jpg<br>p072ch.jpg | p072jp.txt<br>p072en.txt<br>p072ge.txt<br>p072ch.txt |
| DSC-P100 | JP (JAPANESE)<br>EN (ENGLISH)<br>GE (GERMAN)<br>CH (CHINESE) | P100JP<br>P100EN<br>P100GE<br>P100CH | p100jp.jpg<br>p100en.jpg<br>p100ge.jpg<br>p100ch.jpg | p100jp.txt<br>p100en.txt<br>p100ge.txt<br>p100ch.txt |
| DSC-M1 | JP (JAPANESE)<br>EN (ENGLISH)<br>... | M001JP<br>M001EN | m001jp.jpg<br>m001en.jpg<br>... | m001jp.txt<br>m001en.txt<br>... |
| DSC-F828 | JP (JAPANESE)<br>EN (ENGLISH)<br>GE (GERMAN)<br>CH (CHINESE) | F828JP<br>F828EN<br>F828GE<br>F828CH | f828jp.jpg<br>f828en.jpg<br>f828ge.jpg<br>f828ch.jpg | f828jp.txt<br>f828en.txt<br>f828ge.txt<br>f828ch.txt |

METHOD AND APPARATUS FOR PROCESSING INFORMATION AND COMPUTER PROGRAM

CROSS REFERENCES TO RELATED APPLICATIONS

The present invention contains subject matter related to Japanese Patent Application JP 2005-064334 filed in the Japanese Patent Office on Mar. 8, 2005, the entire contents of which are incorporated herein by reference.

BACKGROUND OF THE INVENTION

1. Field of the Invention

The present invention relates to an information processing method, an information processing apparatus, and a computer program. More specifically, the present invention relates to an information processing method, an information processing apparatus, and a computer program for allowing a user to retrieve easily support information unique to a commercial product, and allowing the commercial product to automatically acquire the support information unique thereto so that the support information may be indicated to the user as necessary.

2. Description of the Related Art

Information disclosure techniques are widely known to provide users with user support information relating to a commercial product. The user support information contains defect information about the commercial product after sales, and information collected to help the user to access an answer to any questions the user may have when the user is at a loss about the operation of the product.

In a first well-known information disclosure technique, defect information is publicized in press advertising or posted in retail store houses.

Currently, a second information disclosure technique becomes available along with the advance of networks including the Internet (as disclosed in Japanese Unexamined Patent Application Publication Nos. 2004-19910, 2001-19910, and 2003-296116). In the second technique, not only defect information but also information about frequently asked questions (FAQ), and information relating to accessories to the commercial product are supplied to the user over the World Wide Web (WWW) server and the Internet. More specifically, when the user accesses to a Web site through a client computer, the Web site interactively displays a page posting the FAQ information, questions about defects of a product, questions about how to use the product, and questions about accessories, and a page answering these questions.

With the second technique currently being available, the user can solve questions and inconvenience about the commercial product more easily than with the first technique.

SUMMARY OF THE INVENTION

The following questions are associated with the first and second techniques. The user operates a computer of his own to connect to the Internet and to access a Web server of a manufacturer of a product. A top page of the Web site disclosing user support information is then displayed. Web pages that are typically arranged in hierarchical layers are successively browsed from high to low layer to search for information relating to a product of interest. This operation is inconvenient and time-consuming.

As the amount of user support information increases, the layer structure of the Web site providing the user support information becomes complex. The searching operation becomes more problematic. To retrieve desired information, a significant amount of effort must be made. This is because user support information other than information relating to a product of interest is not important to the user, but detrimental to the retrieval of the user support information about the intended product.

There is a need for a technique that allows user to retrieve easily support information unique to a commercial product, and a further technique that allows the commercial product to retrieve automatically support information unique to thereto so that the support information is indicated to the user as necessary. The phrase "retrieve automatically" means that an apparatus performs a process at the discretion thereof without the aid of the user (in accordance with a judgment of a predetermined program).

The technique disclosed in Japanese Unexamined Patent Application Publication No. 2003-296116 cannot overcome the above-mentioned problem. The disclosed technique is intended to update automatically a system file, and requires communication between a server and a client computer. To establish communications, the user needs to operate the client computer (such as login operation, and input operation for entering minimum information required at the updating of the system file). In the case of a product unable to directly communicate with the server, such as a digital camera, other than the client computer, the second disclosure technique cannot be performed by applying the technique disclosed in Japanese Unexamined Patent Application Publication No. 2003-296116. Even if a purchased product is a client computer, user operation is required.

It is desirable to allow a user to retrieve support information unique to a commercial product, and to allow the commercial product to acquire the support information unique thereto so that the support information is indicated to the user as necessary.

An information processing apparatus of one embodiment of the present invention for communicating with another information processing apparatus that stores model-based product model information relating to a predetermined product model, includes a first storage for storing a model code uniquely identifying the product model of the information processing apparatus, a second storage for storing product model information relating to the product model of the information processing apparatus, a connector for connecting the information processing apparatus with the other information processing apparatus, and a communication controller for controlling the communication between the information processing apparatus and the other information processing apparatus as a connection destination of the connector. The communication controller starts a communication initialization process as a pre-operation for the communication at the discretion of the communication controller when the connector connects the information processing apparatus with the other information processing apparatus. As at least a portion of the communication initialization process, the communication controller controls the transmission of the model code stored on the first storage from the information processing apparatus to the other information processing apparatus. If the other information processing apparatus has identified the product model of the information processing apparatus based on the model code, and has transmitted, to the information processing apparatus, the product model information relating to the identified product model, the communication controller controls the information processing apparatus in the reception of the product model information and then the storage of the product model information on the second storage.

The information processing apparatus preferably includes an indication controller for controlling the information processing apparatus in the indication of the product model information stored in the second storage to a user when the user requests the information processing apparatus to indicate the product model information after the execution of the communication initialization process.

Preferably, the other information processing apparatus stores language-based product model information per piece of model-based production information. The model code stored on the first storage contains information relating to a language set in the information processing apparatus. The communication controller controls the information processing apparatus in the reception of the product model information and then the storage of the received product model information on the second storage if the other information processing apparatus has identified the product model of the information processing apparatus based on the model code, and the language set in the information processing apparatus, and has transmitted to the information processing apparatus the product model information in the identified language out of the language-based product model information relating to the identified product model.

In accordance with another embodiment of the present invention, an information processing method of an information processing apparatus for communicating with another information processing apparatus that stores model-based product model information relating to a predetermined product model. The information processing apparatus includes a first storage for storing a model code uniquely identifying the product model of the information processing apparatus, a second storage for storing product model information relating to the product model of the information processing apparatus, and a connector for connecting the information processing apparatus with the other information processing apparatus. The information processing method includes a communication initialization step of executing a communication initialization process as a pre-operation before the communication is performed between the information processing apparatus and the other information processing apparatus connected to the information processing apparatus via the connector, the communication initialization step being started at the discretion of the information processing apparatus when the connector has connected the information processing apparatus to the other information processing apparatus, a transmission control step of controlling the information processing apparatus in the transmission of the model code stored on the first storage to the other information processing apparatus, and a reception and storage control step of controlling the information processing apparatus in the reception of the product model information and then the storage of the product model information on the second storage if the other information processing apparatus has identified the product model of the information processing apparatus based on the model code, and has transmitted, to the information processing apparatus, the product model information relating to the identified product model.

In accordance with another embodiment of the present invention, a computer program includes the same process steps as those of the information processing method.

In accordance with embodiments of the present invention, the information processing apparatus communicates with the other information processing apparatus that stores model-based product model information relating to the predetermined product model. The information processing apparatus includes the first storage for storing the model code uniquely identifying the product model of the information processing apparatus, the second storage for storing product model information relating to the product model of the information processing apparatus, the connector for connecting the information processing apparatus with the other information processing apparatus. The information processing apparatus performs the communication initialization process as the pre-operation before the communication is performed between the information processing apparatus and the other information processing apparatus connected to the information processing apparatus. The information processing apparatus starts the communication initialization process at the discretion thereof when the connector has connected the information processing apparatus to the other information processing apparatus. At least as part of the communication initialization process, the model code stored on the first storage is transmitted from the information processing apparatus to the other information processing apparatus. When the other information processing apparatus has identified the product model of the information processing apparatus based on the model code, and has transmitted the product model information about the identified product model to the information processing apparatus, the information processing apparatus receives the product model information and stores the received product model information on the second storage.

The communication herein refers to any communication that permits information to be finally exchanged between the information processing apparatus and the other information processing apparatus, and the form of communication is not important. The communication may be wireless communication, wired communication, or a combination of the wireless communication and the wired communication. The communication may be a direct communication performed directly between the information processing apparatus and the other information processing apparatus, or a communication performed via an access point or a network between the information processing apparatus and the other information processing apparatus.

The connection herein refers to a state transition from a communication disabled state between the information processing apparatus and the other information processing apparatus to a communication enabled state between the information processing apparatus and the other information processing apparatus.

The product model refers to a type of product classifying the information processing apparatus according to a predetermined rule. The predetermined rule is not limited to any particular one.

The first storage and the second storage may or may not be different from each other. The first storage and the second storage may be incorporated in the same hardware. In accordance with embodiments of the present invention, a user can acquire the product model information such as the support information unique to the product model (information processing apparatus) via the product model. The product model itself can automatically acquire the product model information thereof. As a result, the product model can indicate the product model information as necessary.

BRIEF DESCRIPTION OF THE DRAWINGS

FIG. 2 illustrates an example of update information as function information;

FIG. 5 illustrates an example of a character file;

FIG. 6 illustrates a model-based and language-based management table stored by an information management server of FIG. 1, the management table managing the "update information";

FIG. 18 illustrates a management table, different from the table of FIG. 16, managing model-based and language-based "update information" stored on the information management server of FIG. 1;

DESCRIPTION OF THE PREFERRED EMBODIMENTS

Figure 1:
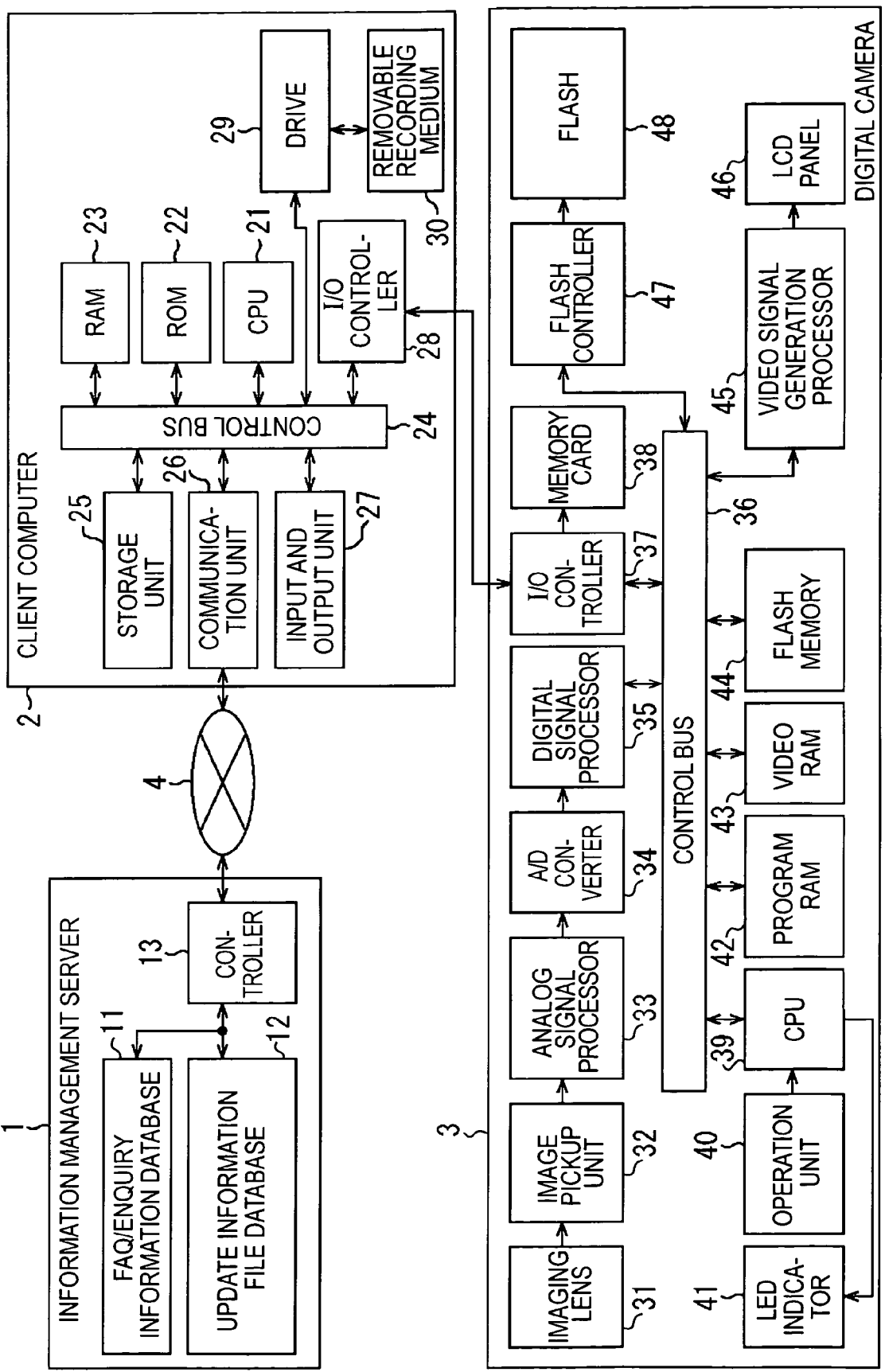
FIG. 1 is a block diagram of an information processing system of one embodiment of the present invention and an information processing system of another embodiment of the present invention including the information processing apparatus.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

An information processing apparatus (for example, a digital camera 3 of FIG. 1) of one embodiment of the present invention for communicating with another information processing apparatus (for example, a client computer 2 of FIG. 1) that stores model-based product model information (for example, a file having a name written in a "corresponding update information display file" item in a management table of FIG. 6, such as product model information of FIG. 2) relating to a predetermined product model, includes a first storage (for example, a first area of a flash memory 44 of FIG. 1) for storing a model code (for example, product model information of FIG. 2, such as a model code written in a "model code to be transmitted" item in a management table of FIG. 6) uniquely identifying the product model of the information processing apparatus, a second storage (for example, a second area of the flash memory 44 of FIG. 1) for storing product model information relating to the product model of the information processing apparatus, a connector (for example, an I/O controller 37 of FIG. 1) for connecting the information processing apparatus with the other information processing apparatus, and a communication controller (for example, a CPU 39 of FIG. 1) for controlling the communication between the information processing apparatus and the other information processing apparatus as a connection destination of the connector. The communication controller starts a communication initialization process as a pre-operation for the communication at the discretion of the communication controller when the connector connects the information processing apparatus with the other information processing apparatus. As at least a portion of the communication initialization process, the communication controller controls the transmission of the model code stored on the first storage from the information processing apparatus to the other information processing apparatus. If the other information processing apparatus has identified the product model of the information processing apparatus based on the model code, and has transmitted, to the information processing apparatus, the product model information relating to the identified product model, the communication controller controls the information processing apparatus in the reception of the product model information and then the storage of the product model information on the second storage.

The information processing apparatus preferably includes an indication controller (for example, a video signal generation processor 45 of FIG. 1) for controlling the information processing apparatus in the indication of the product model information stored in the second storage to a user when the user requests the information processing apparatus to indicate the product model information after the execution of the communication initialization process.

Preferably, the other information processing apparatus stores language-based product model information for each piece of model-based product model information (for example, the update information of a predetermined product model of each of JP (Japanese), EN (English), GE (German), and CH (Chinese) in the management table of FIG. 6) in the product model information per model. The model code stored on the first storage contains information relating to a language set in the information processing apparatus (for example, a character string "JP" identifying Japanese language from among the model code "P072JP" written on the top of the management table of FIG. 6). The communication controller controls the information processing apparatus in the reception of the product model information and then the storage of the received product model information on the second storage if the other information processing apparatus has identified the product model of the information processing apparatus based on the model code, and the language set in the information processing apparatus, and has transmitted to the information processing apparatus the product model information in the identified language out of the language-based product model information relating to the identified product model.

Figure 12:
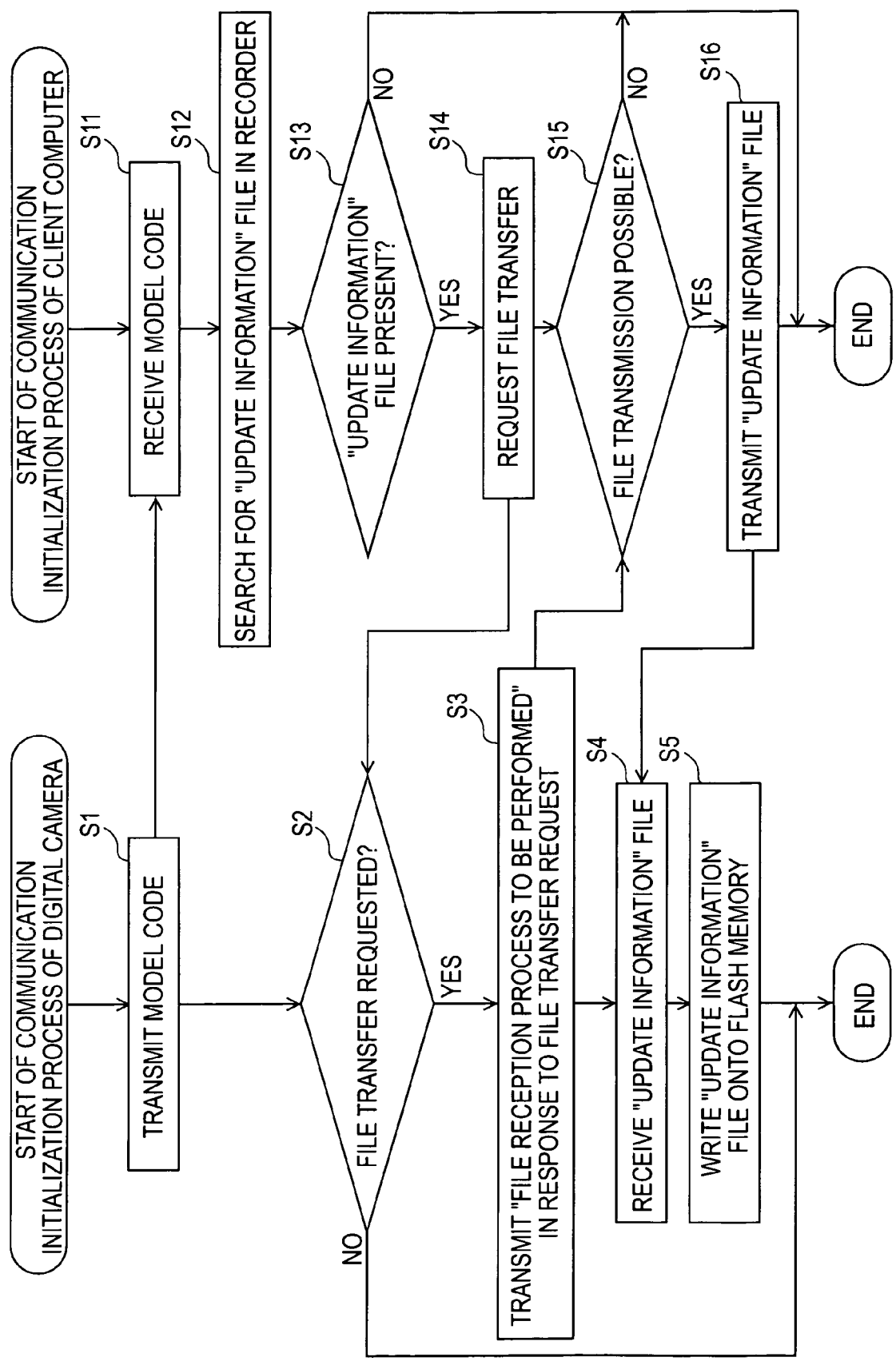
FIG. 12 is a flowchart illustrating a communication initialization process performed by the digital camera and a client computer of FIG. 1.

In accordance with another embodiment of the present invention, an information processing method includes a communication initialization step (a communication initialization process of a digital camera of FIG. 12) of executing a communication initialization process as a pre-operation before the communication of is performed between the information processing apparatus and the other information processing apparatus connected to the information processing apparatus via the connector, the communication initialization step being started at the discretion of the information processing apparatus when the connector has connected the information processing apparatus to the other information processing apparatus, a transmission control step (for example, step S1 of FIG. 12) of controlling the information processing apparatus in the transmission of the model code stored on the first storage to the other information processing apparatus, and a reception and storage control step (for example, steps S4 and S5 of FIG. 12) of controlling the information processing apparatus in the reception of the product model information and then the storage of the product model information on the second storage if the other information processing apparatus has identified the product model of the information processing apparatus based on the model code, and has transmitted, to the information processing apparatus, the product model information relating to the identified product model.

The present invention also provides a computer program corresponding to the information processing method, and a recording medium storing the computer program. The computer program is executed by the CPU 39 of FIG. 1.

The embodiments of the present invention are described below with reference to the drawings.

The embodiments of the present invention are described below with reference to FIG. 1.

As shown in FIG. 1, the information processing system includes an information management server 1, a client computer 2, and a digital camera 3. The information management server 1 mutually communicates with the client computer 2 via a predetermined network 4 such as the Internet. The client computer 2 mutually communicates with the digital camera 3.

The information management server 1 is managed by one of a person who manufactures a variety of models of digital cameras including the digital camera 3 (hereinafter referred to as manufacturer), a person who assigns (including sells) the digital camera 3 to a user (hereinafter referred to as an assignor), and a person who is entrusted to the management of the product model by one of the manufacturer and the assignor (hereinafter referred to as an agent). The manufacturer, the assignor, the agent, and the user may be a physical person, a legal person, or a financial group not contained in a legal person.

FIG. 1 illustrates a single information management server 1 only. In practice, however, a plurality of servers respectively managed by a plurality of manufacturers are typically connected to the network 4. The single client computer 2 and the single digital camera 3 are shown in FIG. 1. In practice, however, the system includes at least client computers and digital cameras, the number of which is equal to the number of users. Some users may use a plurality of client computers and a plurality of digital cameras.

For simplicity of explanation, it is assumed that the information management server 1 is managed by a single manufacturer, and that the client computer 2 and the digital camera 3 are managed by a single user.

In the present embodiment, the manufacturer manages "update information" files per product model and per language as information relating to a variety of digital cameras (including the digital camera 3), in addition to the user support information including FAQ information and defect information.

The "update information" is information at latest time when the manufacturer starts the management of the information, out of information relating to a predetermined digital camera model (including the user support information). The latest time means any time set by the manufacturer. In the present embodiment, the latest time is the day one week earlier than the current day. More specifically, in the present embodiment, the manufacturer updates the "update information" on a predetermined day of the week, and manages the update information until the same day.

FIG. 2 illustrates such update information. As shown in FIG. 2, the update information is divided into "important information" and "recently received information" as major pieces of information. The important information and the recently received information are represented by symbols such as characters.

More in detail, arranged as the important information are a symbol string "■ important information", "defect information of this model:", and "currently no information for this product" from top of screen. As shown in FIG. 2, in response to the reception of no particular defect information present at the latest time, the symbol string "currently no information for this product" is included into the important information. The important information includes at least defect information of the update user support information.

As shown in FIG. 2, the "recently received information" includes a symbol string "■ recently received information", a symbol string "for use overseas:", and a symbol string "this model can work up to 220 VAC supply overseas" arranged from up to down on the screen. As shown in FIG. 2, a question such as "I want to use this digital camera model overseas. Is this digital camera model operable from different power supply voltages overseas?" is received from several users (not necessarily including a user managing the digital camera 3 of FIG. 3) at the latest time. The manufacturer may answer the question, for example, sending a reply stating "This product model complies with power supply voltage up to 220 VAC, and can be used without any problem if power supply voltage available at an oversea trip destination is 220 VAC". Such a question and answer session is presumably repeated several times. In response to such a question and answer session, the symbol string "for use overseas:" and the symbol string "This model can work up to 200 VAC supply overseas" are contained in the "recently received information". The important information contains at least the FAQ information out of the update user support information. From the standpoint of the update information, a question and an answer may be contained as the FAQ information into the "recently received information" even if a single question and answer session has been conducted only one time.

In accordance with the present embodiment, the manufacturer divides the information relating to the digital cameras manufactured by the manufacturer itself (including the digital camera 3) between information after the latest time and information before the latest time for management on a per product model basis and a per language basis. The information after the latest time is referred to as the "update information", and the information before the latest time is simply referred to as the user support information. In accordance with the present embodiment, when it becomes a next predetermined day of the week, the "update information" is managed as the user support information. In this case, all or part of update information may be managed as the user support information.

The manufacturer uses the information management server 1 to control the update information and the user support information. The information management server 1 includes a FAQ/enquiry information database 11 storing, as files, the user support information on a per product model basis (model-based user support information) and the user support information on a per language basis (language-based user supported information), and an update information file database 12 storing, as files, the update information on a per product basis (model-based update information) and the update information on a per language basis (language-based update information). A file of the update information is simply referred to as an update information file. The information management server 1 further includes a controller 13 for generally controlling operation of the information management server 1. For example, the controller 13 controls transmission and reception of a variety of information units to and from the client computer 2 via the network 4. More specifically, the controller 13 controls the information management server 1 in the transmission of at least one unit of model-based and language-based update information to the client computer 2 via the network 4.

A format of the update information file stored on the update information file database 12 is described below.

As previously discussed, the update information is composed of a plurality of symbols. The format of the update information file is a text file, for example.

As will be discussed later, the update information needs to be displayed on a liquid-crystal display (LCD) panel 46. If a text file is adopted as the format of the update information file, the update information of the update information file cannot be displayed on the LCD panel 46 depending on the format of the digital camera 3.

This problem will described in detail below with reference to FIGS. 3 and 4.

Figure 3:
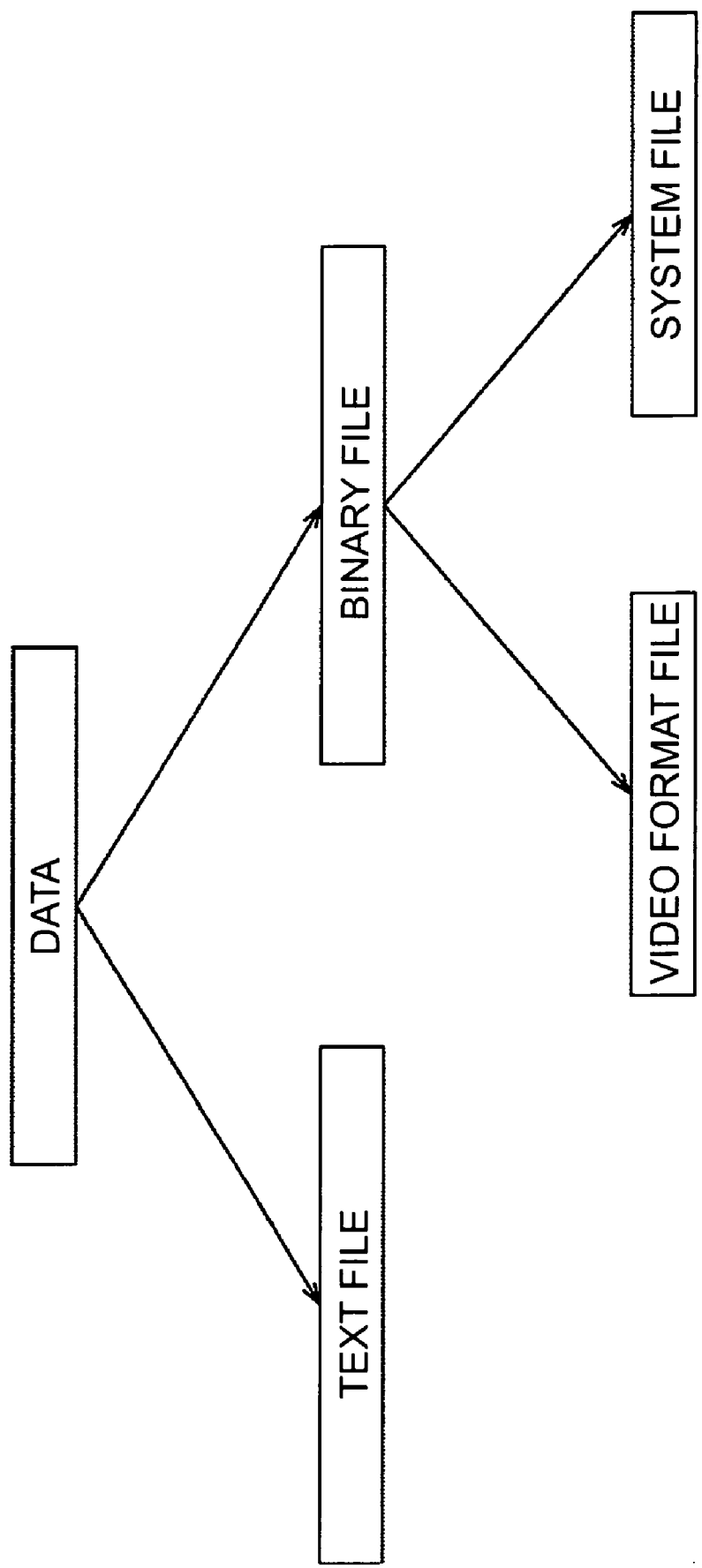
FIG. 3 illustrates a file format of data.
Figure 4:
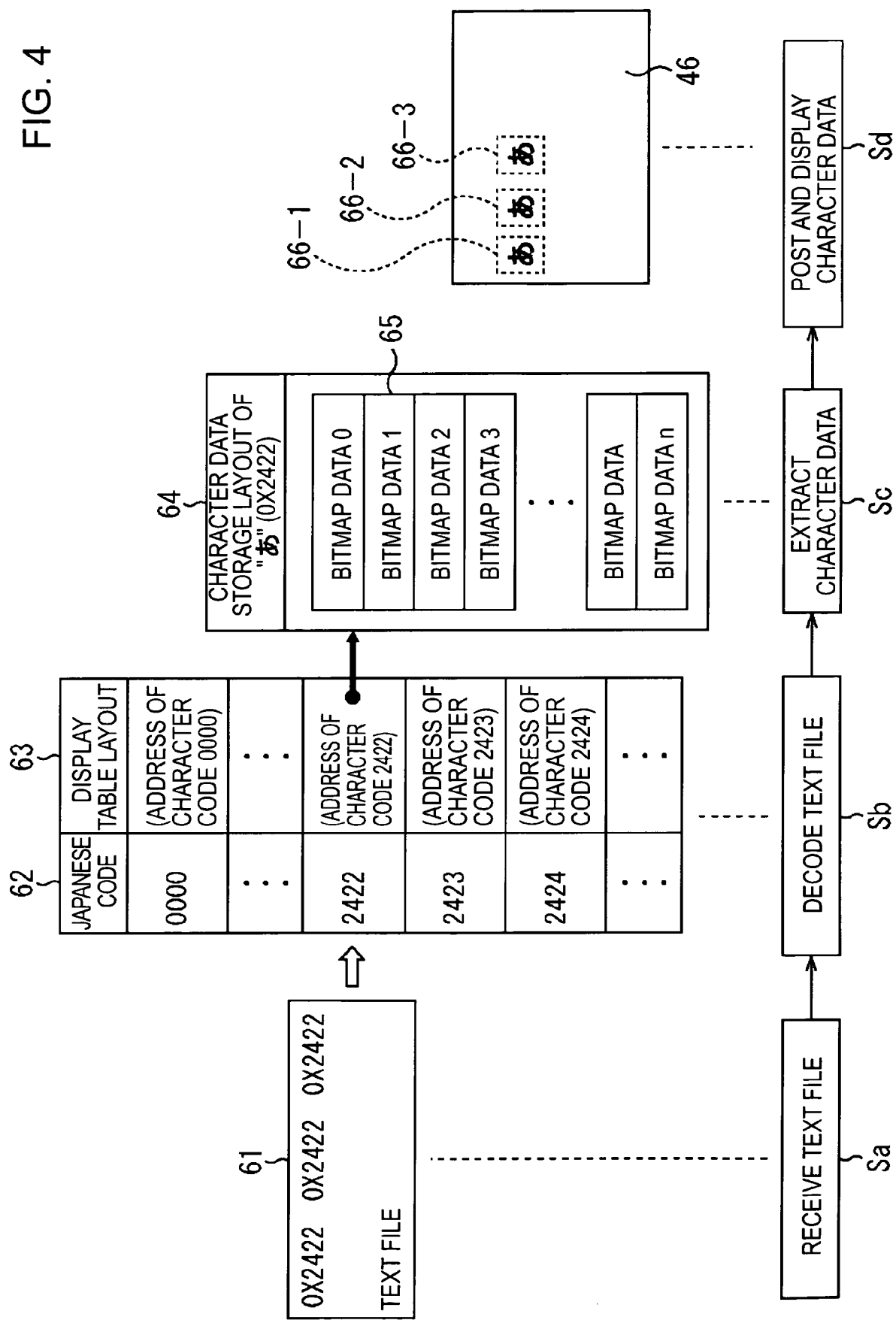
FIG. 4 illustrates a series of process steps to display information described in a text file.

FIG. 3 illustrates classification of data formats the digital camera 3 can handle. As shown in FIG. 3, the data format is divided into a text file and a binary file. The binary file is further divided into a video format file and a system file.

The system file refers to a file of program to be executed by the digital camera 3. Furthermore, a hyper text markup language (HTML) text file handling an image of symbols including characters also exists. A symbol string, out of information presented in an HTML file, includes a symbol string as is (more precisely, in a code to be discussed later), and an image of the HTML file includes a symbol string specifying a video format file corresponding to the image (for example, a location of the video format file). The sentence (symbol string) contained in the HTML file is handled in the same manner as the symbol contained in the text file. An image cannot be displayed using an HTML file alone. To display an image, a video format file specified by the symbol string contained in the HTML file is required.

In accordance with the present embodiment, the update information contains no image but a symbol such as character, and the update information file is basically either the text file or the video format file.

For example, if the update information file is a text file, each symbol forming the update information is not a symbol itself but is described in code corresponding to the symbol. Steps Sa through Sd of FIG. 4 are required for the digital camera 3 to display the update information (a group of symbols described in code) contained the update information file (text file) on the LCD panel 46 to be described later. FIG. 4 describes a series of process steps to display the symbols described in code in the text file.

For simplicity of explanation, the update information of the digital camera 3 as a product model includes a symbol string (character string) ""ああ".". In this case, a code corresponding to the character "あ (pronounced 'a')" is "0X2422" of Japanese language code 62 defined in Japan Industrial Standard (JIS). The update information file database 12 stores, as the update information file for the digital camera 3 as the product model, a text file 61 "0X2422 0X2422 0X2422" shown in FIG. 4.

In step Sa, the digital camera 3 receives the text file 61 from the client computer 2 via the network 4. How the digital camera 3 receives the update information file thereof will be specifically described later.

In step Sb, the digital camera 3 decodes the text file 61.

More specifically, a display table layout 63 composed of a plurality of tables with each of the Japanese language codes 62 being an address thereof (hereinafter referred to as an address value) is arranged in at least a portion of a memory of the digital camera 3 (such as a flash memory 44 of FIG. 1 to be discussed later). Stored in each of the tables forming the display table layout are video data (hereinafter referred to as character data) for displaying a symbol corresponding to a code as the address value of own table as bitmap data every n+1 fonts (n is an integer equal to or larger than 0). The table 64 having an address value 0X2422 stores character data ""あ".". More specifically, the table 64 of FIG. 4 stores bitmap data of the character data of ""あ"" every n+1 fonts.

The digital camera 3 determines that character data of a first code "0X2422" of the codes contained in the text file 61 is stored in the table 64 having an address value "0X2422". Similarly, the digital camera 3 determines that the character data of a second code "0X2422" and a third code "0X2422" are all stored on the table 64 having the address value "0X2422".

In step Sc, the digital camera 3 extracts a single unit of character data stored in the table 64 having an address value of "0X2422". To display a symbol by a first one of the first through N-th fonts, the digital camera 3 extracts bitmap data 65 from (n+1) units of character data (bitmaps) stored in the table 64 having an address value of "0X2422".

More specifically, the bitmap data 65 of numerical data shown in FIG. 5 is extracted in step Sc.

In step Sd, the digital camera 3 displays image 66-1 through image 66-3 corresponding to the extracted character data of ""あ"" (bitmap data) 65, namely, the image 66-1 through 66-3 of ""あ"" expressed by the first font on a predetermined position on the LCD panel 46.

The above discussion is based on the premise that the digital camera 3 has stored the character data ""あ"" (bitmap data) 65, i.e., on the premise that the table 64 having an address value "0X2422" representing the character ""あ"" is stored in the digital camera 3. When the text file 61 containing the code "0X2422" is supplied, the digital camera 3 can display the character (symbol) ""あ"" corresponding to the code "0X2422" on the LCD panel 46 using a single unit of character data (for example, the character data 65 in FIG. 4) contained in the table 64.

The premise that the table 64 storing the character data relating to the character ""あ"" is stored beforehand does not always happen. More specifically, the table 64 is not necessarily stored in the display table layout 63.

The digital camera 3 is supplied with language setting different from assignee to assignee (from purchaser to purchaser). If the assignee is in Japan, the digital camera 3 is set in Japanese. If the assignee is in People's Republic of China, the digital camera 3 is typically set in Chinese.

The setting of a Japanese display means that the character data corresponding to the Japanese language code 62 defined in JIS is stored beforehand. Similarly, the setting of a Chinese display means that the character data corresponding to code defined in Guo Biao (GB) standard is stored beforehand.

If the digital camera 3 is set to display a language (such as Chinese) other than Japanese, and is not set to display Japanese language, the table 64 containing the character data of the character ""あ"" does not exist in the digital camera 3. Non-existence of the table 64 containing the character data of the character ""あ"" means not only that a table having an address of "0X2422" is not present, but also that even if a table having an address of "0X2422" is present, the character data stored in that table is character data for a symbol different from the character ""あ".", namely, the code "0X2422" is mapped to a symbol different from the character ""あ".". Even if the text file 61 is received in such a case, the digital camera 3 cannot display the symbol at all, or displays a symbol different from the character ""あ".", leading to a garbled character.

Even if the digital camera 3 is set to display Japanese language, the number of codes (number of symbols) defined in JIS is as many as 6879, and the character data of all codes (all symbols) defined in JIS are not necessarily stored in the digital camera 3.

Since not only a computer such as the client computer 2 but also a mobile communication terminal such as a mobile telephone needs a browsing function for browsing electronic mails and Web sites, the character data of all codes defined in JIS are pre-stored thereon.

In contrast, unlike the client computer 2 the digital camera displays predetermined symbols forming a fixed message but is less likely to display symbols other than the predetermined symbols. If an attempt is made to store the character data of all symbols defined in JIS, in other words, if an attempt is made to create a display table layout formed of 6879 tables having, as address values, 6879 codes defined in JIS, a volume of an internal memory (such as the flash memory 44 of FIG. 1) is substantially consumed. To solve this problem, two solutions are contemplated. A high-volume memory is used in a first solution. Character data for symbols forming a predetermined message only is stored in a second solution. Since high-volume memories are costly, many manufacturers adopt the second solution to reduce costs.

If the digital camera 3 of the present embodiment incorporates the second solution, i.e., the digital camera 3 storing the character data of the symbols forming the predetermined message is manufactured, the digital camera 3 naturally does not store the character data for the character ""あ"" if the character ""あ"" is not contained in the symbols forming the predetermined message. Namely, the digital camera 3 does not store the table 64 containing the character data corresponding to the code "0X2422". Even if the text file 61 is received in such a case, the digital camera 3 cannot display the symbol string ""ああ"" on the LCD panel 46.

If a text file is used as the format of an update information file, one or more units of character data (and a table containing the one unit of character data) corresponding to each code contained in the update information file may not be stored depending on the arrangement of the digital camera 3. In such a case, the digital camera 3 cannot display the update information corresponding to the update information file on the LCD panel 46.

Even if the digital camera 3 is set to display a language other than Japanese language, for example, Chinese language, the number of symbols defined in GB is as many as about 7400. Most of manufacturers adopt the second solution, and the same problem arises.

To overcome this drawback, the present embodiment incorporates at least one of a video format file as the format of the update information file. Furthermore, both the video format file and the text file can be incorporated as will be described later.

If the update information relating to the product model of the digital camera 3 is a symbol string such as the above-described ""あああ".", the digital camera 3 stores, as the update information file, a video format file handling, as one image, the symbol string ""あああ".", instead of the text file image, on the update information file database 12.

More specifically, in the present embodiment, the controller 13 in the information management server 1 of FIG. 1 manages a table of FIG. 6. A file having a file name described in the column of "display file of corresponding 'update information'" in the table is stored as an update information file on the update information file database 12.

FIG. 6 illustrates an example of a management table of the update information file. Items "model name", "selected language", "model code to be transmitted", and "display file of corresponding update information" are arranged on the top row from left to right on the table of FIG. 6.

The "model name" item lists the model names of digital cameras currently produced or produced in the past by the manufacturer managing this management table, namely the manufacturer managing the information management server 1 of FIG. 1. More specifically, the model names of digital cameras currently produced or produced in the past by this manufacturer include "DSC-P72", "DSC-P100", "DSC-M1", and "DSC-F828".

The "selected language" item lists languages (hereinafter set languages) set in the digital cameras having the model names listed in the "model name" item listed to the left of the "selected language" item, for example, the set languages of the digital camera of the product model "DSC-P72" (product model on the top of the table of FIG. 6) include Japanese (JP), English (EN), German (GE), and Chinese (CH).

The "model code to be transmitted" item lists identifiers (model codes) of digital cameras having the model names listed in the "model name" item on the left. The identifiers identify the digital camera in which the language listed in the item "selected language" arranged on the left to the "model code to be transmitted" item. For example, the model code of the digital camera with JP (Japanese) set, from among the digital cameras having the product model "DSC-P72" (product model on the top of the list), is "P072JP". The model code of the digital camera with EN (English) set is "PO72EN", the model code of the digital camera with GE (German) set is "P072GE", and the model code of the digital camera with CH (Chinese) set is "P072CH".

As will be described later, the internal memories (flash memories 44 of FIG. 1) of all digital cameras including the digital camera 3 (i.e., all digital cameras manufactured by the manufacturer managing the information management server 1) store the model code identifying their own product model.

The "display file of corresponding 'update information'" item lists the names of the update information files of the digital cameras identified by the model codes listed in the item "model code to be transmitted" on the left thereto. The update information files listed in the display file of corresponding update information item are video format files in which the update information described in the language listed in the selected language item on the left is handled as an image. More specifically, the update information file having a name "p072jp.jpg" listed on the top relates to the digital camera with JP set, from among the digital cameras of the product model "DSC-P72", and is the video format file in which the update information described in JP is handled as an image.

In accordance with the present embodiment, the format of the update information file is a video format file having an extension jpg, i.e., a video format file of joint photographic experts group (JPEG). Alternatively, another video format file may be employed for the file format of the update information.

Returning back to FIG. 1, the update information file managed by the management table of FIG. 6 on a per product model basis and on a per language basis is stored as the video format file on the update information file database 12 in the information management server 1.

The controller 13 in the information management server 1 controls to transmit at least part of the model-based and language-based update information files to the client computer 2 via the network 4.

More specifically, at least part of the model-based and language-based update information files of the digital cameras is supplied from the information management server 1 to the client computer 2 via the network 4. In the present embodiment, all update information files described in the names listed in the "display file of corresponding 'update information'" item in the management table of FIG. 6 are supplied together with the management table from the information management server 1 to the client computer 2.

As shown in FIG. 1, the client computer 2 includes a central processing unit (CPU) 21 through a drive 29.

The CPU 21 executes a variety of programs under the control of a program stored on a read-only memory (ROM) 22 or a program stored on a random-access memory (RAM) 23. The RAM 23 stores, as necessary, data required for the CPU 21 to execute the variety of process.

The CPU 21, the ROM 22 and the RAM 23 are mutually connected via a control bus 24. The control bus 24 connects to a storage unit 25 including a hard disk, a communication unit 26 including a modem and a terminal adaptor, an input and output unit 27 including a mouse, a keyboard, etc., and an I/O controller 28. The communication unit 26 performs a communication operation with the information management server 1 via the network 4 including the Internet. The I/O controller 28 performs a communication operation with the digital camera 3 in compliance with universal serial bus (USB) standard, namely, via a USB cable.

The control bus 24 also connects to the drive 29 as necessary. The drive 29 is loaded with a removable recording medium 30 such as a magnetic disk, an optical disk, a magneto-optical disk, or a semiconductor memory. A computer program read from the removable recording medium 30 is installed on the storage unit 25 as necessary.

One of processes of the client computer 2, namely, the process of the client computer 2 performed together with the information management server 1 is described below.

The CPU 21 in the client computer 2 managed by a user accesses the network 4 by controlling the communication unit 26. The CPU 21 initiates and executes an application software program for communication with the client computer 2 (hereinafter referred to as communication software program), from among application software programs installed on the storage unit 25. Without the aid of the user, the communication software program automatically accesses the information management server 1, thereby requesting the controller 13 in the information management server 1 to retrieve an update information file.

The controller 13 in the information management server 1 controls to transmit all model-based update information files and all language-based update information files stored on the update information file database 12 together with the management table thereof to the client computer 2 via the network 4. In the present embodiment, all model-based update information files and all language-based update information files are all update information files having the names listed in the "display file of corresponding 'update information'" item of the management table of FIG. 6.

The communication software program of the client computer 2 causes the storage unit 25 to store all update information files transmitted from the information management server 1. In the present embodiment, the storage unit 25 stores all update information files having the names thereof listed in the "display file of corresponding 'update information'" item of the management table of FIG. 6 and the management table thereof.

In the above discussion, the client computer 2 automatically retrieves the update information file without the aid of the user. Alternatively, the client computer 2 may access the information management server 1 to retrieve the update information file only when the user issues a command to retrieve the update information file.

In the above discussion, the client computer 2 retrieves all model-based update information files and all language-based update information files. As will be discussed later, however, since the model code can be retrieved from the digital camera 3, the client computer 2 may retrieve only the update information file of the model code of the digital camera 3, from among the model codes described in the "model code to be transmitted" item of the management table of FIG. 6. More specifically, if the model code of the digital camera 3 is "P072JP" on the top of the management table of FIG. 6, the client computer 2 may retrieve only the update information file having the name "p072jp.jpg".

The process of the client computer 2 performed together with the information management server 1 has been discussed. A process of the client computer 2 performed together with the digital camera 3 will be described later with reference to FIG. 12.

The system configuration of the information management server 1 and the client computer 2 has been discussed with reference to FIG. 1.

The internal structure of the digital camera 3 is continuously described below with reference to FIG. 1.

As shown in FIG. 1, the information management server 1 includes an imaging lens 31 through a flash 48.

The imaging lens 31 focuses an image of a subject on the surface of an image pickup unit 32. The image pickup unit 32 composed of a charge-coupled device (CCD), etc., supplies an analog video signal to an analog signal processor 33 after photoelectrically converting the image of the subject focused on the surface thereof.

The analog signal processor 33 performs a variety of analog signal processes including a gamma correction process and a white balance process on the analog video signal supplied from the image pickup unit 32, and then supplies a signal-processed analog video signal to the analog-to-digital (A/D) converter 34. The A/D converter 34 analog-to-digital converts the analog video signal, thereby supplying a resulting digital video signal to a digital signal processor 35.

The digital signal processor 35 supplies the digital video signal supplied from the A/D converter 34 to a video RAM 43 for temporal storage via a control bus 36.

The digital signal processor 35 performs a compression coding process on the digital video signal as necessary in accordance with predetermined video compression coding process (such as JPEG method as previously described). The digital video signal to be video-signal compression coded (hereinafter referred to as an compression encoded video signal) is supplied from the video RAM 43 via the control bus 36. A digital video signal resulting from the video-signal compression coding process is supplied to a memory card 38 for storage via an I/O controller 37.

The digital signal processor 35 performs a video-signal decompression decoding process on the compression encoded video signal in accordance with a predetermined video-signal decompression decoding process (such as JPEG method in the present embodiment). The compression encoded video signal to be decompression decoded is supplied from one of the video RAM 43 and the memory card 38 via the control bus 36. An original video signal restored as a result of video-signal decompression decoding process is supplied to a video signal generation processor 45 via the control bus 36.

The digital signal processor 35 connects to the control bus 36. The control bus 36 connects to the I/O controller 37, a CPU 39, a program RAM 42, the video RAM 43, the flash memory 44, the video signal generation processor 45, and a flash controller 47.

The I/O controller 37 performs a communication process with the client computer 2 in accordance with the USB standard, namely, via a USB-based cable. The I/O controller 37 also performs a communication process with the memory card 38 (to read data therefrom and writes data thereon).

In response to a signal (responsive to a user operation) from the operation unit 40, and at the discretion of the user, the CPU 39 performs a variety of processes in accordance with a variety of programs loaded from the flash memory 44 to the program RAM 42. The general operation of the digital camera 3 is thus controlled. The program RAM 42 also stores, as necessary, data required for the CPU 39 to perform the variety of processes. The CPU 39 directly controls to initiate and stop light emission of at least one light emitting diode (LED) forming an LED indicator 41.

The operation unit 40 and the LED indicator 41 will be described later with reference to FIGS. 7 through 9.

As previously discussed, the video RAM 43 temporarily stores the digital video signal supplied from the digital signal processor 35 via the control bus 36. The digital video signal temporarily stored on the video RAM 43 is read by another element such as the digital signal processor 35 as necessary.

The flash memory 44 stores the variety of programs to be executed by the CPU 39. The variety of programs stored on the flash memory 44 will be described later.

The flash memory 44 stores a variety of units of information used in a predetermined one of these programs, including a help menu (an image D02 of FIG. 11, for example) to be used in a help function. The help function will be described later with reference to FIG. 11.

The flash memory 44 also stores character data of a predetermined language. In the present embodiment, for example, the flash memory 44 stores the Japanese language character data, namely, the character data related to at least part of the symbols defined in the JIS. More precisely, a predetermined area of the flash memory 44 is used for the previously described display table layout.

Furthermore, the flash memory 44 stores the model code of the digital camera 3. In the present embodiment, "P072JP" described on top the list in the "model code to be transmitted" item of the management table of FIG. 6 is stored as the model code of the digital camera 3 onto the flash memory 44.

The flash memory 44 also stores the above-described update information file. The discussion as to how and when the update information file is stored onto the flash memory 44 is provided later with reference to FIG. 12.

The video signal generation processor 45 generates a signal in a format compatible with the LCD panel 46 (hereinafter referred to as a video signal) from the digital video signal supplied from one of the video RAM 43 and the digital signal processor 35, and then supplies the video signal to the LCD panel 46. The LCD panel 46 displays a video responsive to the video signal.

The flash controller 47 controls the light emission of the flash 48 as the name thereof implies. The flash 48 includes a xenon flash lamp that flashes light under the control of the flash controller 47.

FIGS. 7 through 10 show the external appearance of the digital camera 3 thus constructed. The external appearance of the digital camera 3 is described below with reference to FIGS. 7 through 10.

The digital camera 3 has six external surfaces. The digital camera 3 includes a front surface having the imaging lens 31 thereon, a rear surface opposed to the front surface, a top surface, perpendicular to the front surface, having a shutter 40a (top surface shown in FIGS. 7 through 10), a bottom surface opposed to the top surface, and the remaining two surfaces as side surfaces. One of the two side surfaces on the left-hand side, if viewed from the front, shown in FIGS. 9 and 10, is referred to a left side surface, and the side surface opposed to the left side surface is referred to as a right side surface.

Figure 7:
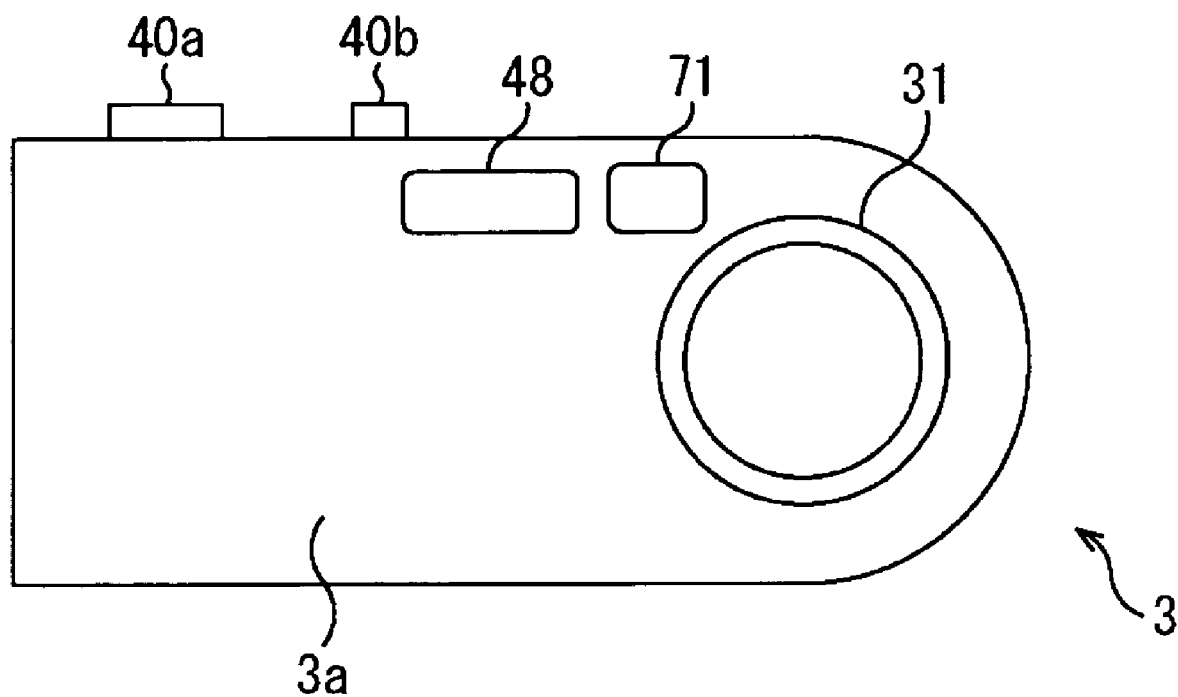
FIG. 7 is a front view illustrating the front of a digital camera of FIG. 1.

FIG. 7 is a front external view of the digital camera 3. FIG. 8 is a rear external view of the digital camera 3. FIGS. 9 and 10 are left-side external views of the digital camera 3.

As shown in FIG. 7, the imaging lens 31 is arranged on the left portion of the front surface 3a of the digital camera 3. An optical viewfinder 71 and a flash 48 are arranged on an upper left portion above the imaging lens 31 as shown in FIG. 7.

As shown in FIG. 7, a shutter button (release button) 40a, and a power switch button 40b are arranged on the top surface of the imaging lens 31 in the order from left to right.

Figure 8:
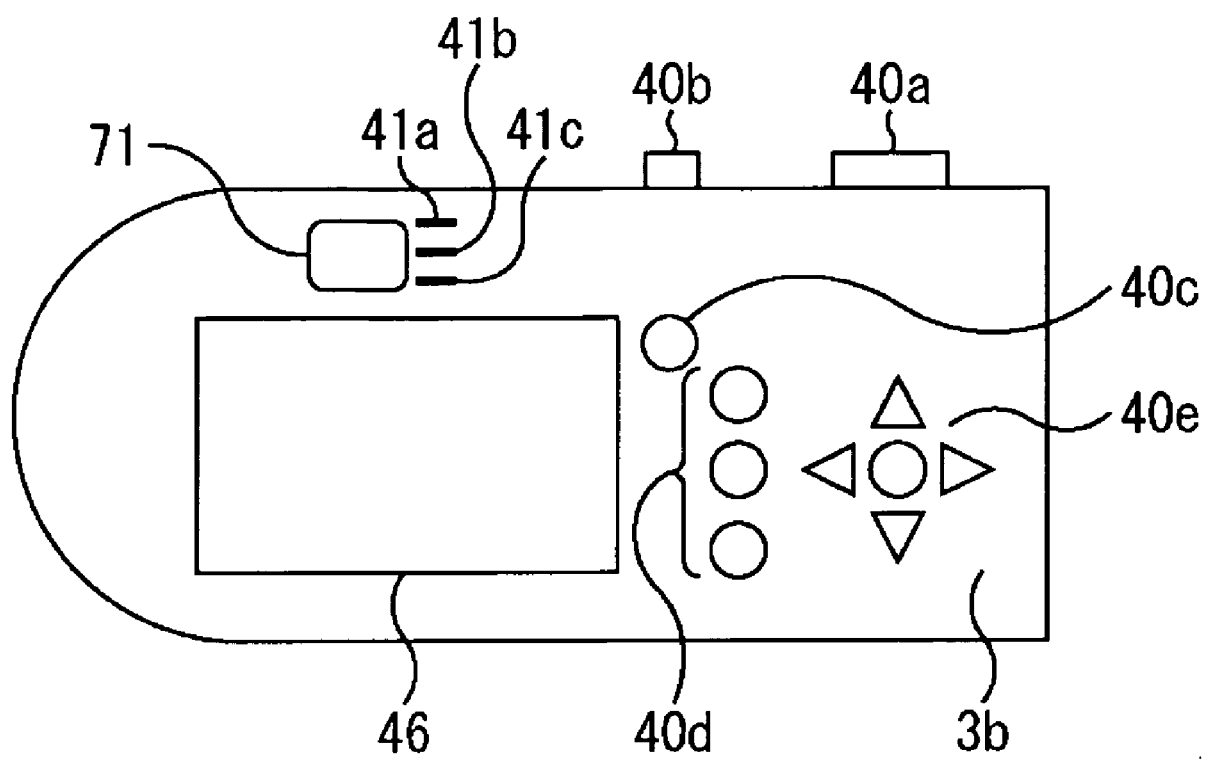
FIG. 8 is a rear view illustrating the rear of the digital camera of FIG. 1.

As shown in FIG. 8, menu cursor command buttons, and selection command buttons 40e are arranged on the right hand portion of the rear surface 3b of the digital camera 3. A LCD panel display switch button 40c, and function buttons 40d are arranged on the left portion of the rear surface 3b in the order from up to down. The LCD panel 46 is arranged on the left to the LCD panel display switch button 40c and the function buttons 40d. The optical viewfinder 71, and three LEDs 41a through 41c forming the LED indicator 41 are arranged above the LCD panel 46 on the rear surface 3b in the order from left to right. In the present embodiment, the LED 41a functions as an auto-focus in-focus verification LED diode, the LED 41b functions as a photographing LED diode, and the LED 41c functions as a flash charge-up verification LED diode.

As shown in FIGS. 7 and 8, the operation unit 40 of FIG. 1 is composed of the release button 40a, the power switch button 40b, the LCD panel display switch button 40c, the function buttons 40d, the menu cursor command buttons, and selection command button 40e. The functions of these buttons of the operation unit 40 are described later as necessary.

Figure 9:
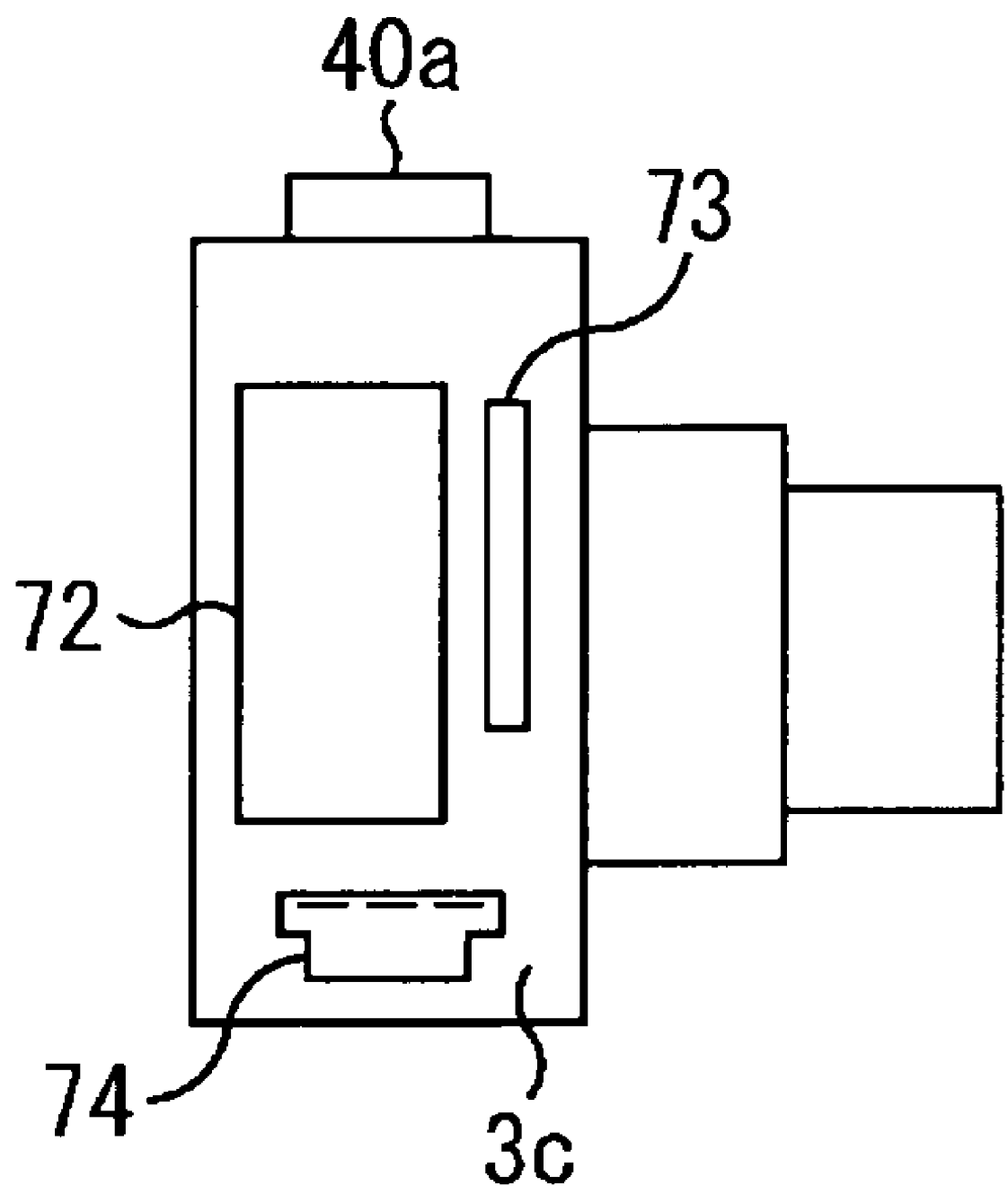
FIG. 9 is a left-side view illustrating the left side of the digital camera of FIG. 1, with a protective cover removed therefrom.
Figure 10:
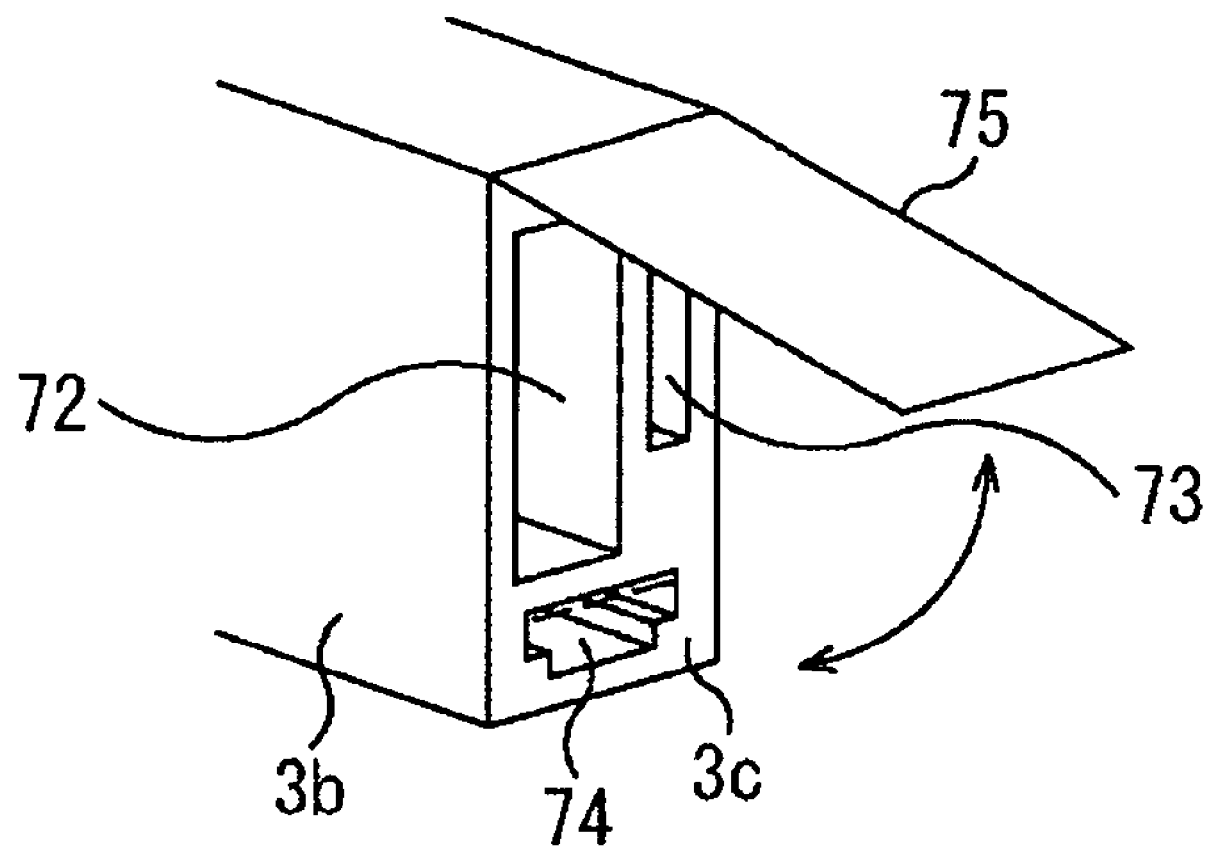
FIG. 10 is a left-side view illustrating the left side of the digital camera of FIG. 1, with the protective cover attached thereto.

As shown in FIG. 9, a USB terminal socket (external connection terminal port) 74 is arranged on the lower portion of the left-side surface 3c of the digital camera 3. Furthermore, a battery slot 72 and a video recording memory card slot 73 are arranged above the USB terminal socket 74 on the left-side surface 3c.

In the present embodiment, one end of a USB cable is connected to the USB terminal socket 74, and the other end of the USB cable is connected to the client computer 2. The I/O controller 28 in the client computer 2 is thus connected to the I/O controller 37 in the digital camera 3, thereby allowing communications between the client computer 2 and the digital camera 3.

The digital camera 3 is operated from a battery (not shown) in the present embodiment. To insert the battery, the battery slot 72 is provided.

With the memory card 38 of FIG. 1 inserted in the video recording memory card slot 73 in the present embodiment, the I/O controller 37 controls to write data (such as compression encoded video data) to and read data from the memory card 38.

As shown in FIG. 10, the left-side surface 3c of the digital camera 3 is covered with an openable protective cover 75. With the protective cover 75 in place, the battery slot 72, the video recording memory card slot 73, and the USB terminal socket 74 are not exposed to the outside. The user opens the protective cover 75 during the replacement of the battery, or during the connection of the digital camera 3 to the client computer 2.

The appearance and the internal structure of the digital camera 3 have been discussed.

The operation (process) of the digital camera 3 thus constructed is described below.

In the present embodiment, the CPU 39 in the digital camera 3 of FIG. 1 loads a predetermined program from the flash memory 44 to the program RAM 42, and executes the variety of processes in accordance with the program to generally control the digital camera 3.

In the present embodiment, the programs executed by the CPU 39, namely, the program stored on the flash memory 44, include at least a first program through a fifth program.

The first program is a photograph control program of the digital camera 3.

The second program is a video playback program.

The third program is a program for editing video (image deletion, image rotation, and image printing).

The fourth program is a program for exchanging a variety of pieces of information with an external apparatus (client computer 2 in this embodiment) connected via the USB terminal socket 74 as an external connection terminal.

The fifth program is a program for controlling a display content of the LCD panel 46 as a display of the digital camera 3.

Processes in accordance with the first, second, and fifth programs are successively described below. A process in accordance with the fourth program will be described below in the discussion of the fifth program. The process in accordance with the third program is omitted herein.

The process of the first program, namely, the photographing process of the digital camera 3 is described below.

The photographing process is mainly divided into two processes, namely, a pre-process prior to the pressing of the release button 40a of FIG. 7, namely, a process to be performed while a user observes a subject, and a process subsequent to the pressing of the release button 40a, namely, a process in which the user performs a photographing operation to the subject. The former process is referred to as a subject observation process and the latter process is referred to as a photographing process.

The subject observation process is performed as described below.

The image of the subject focused through the imaging lens 31 of FIG. 1 is photoelectrically converted through the image pickup unit 32, and then output as an analog video signal. The analog signal processor 33 performs the gamma correction process and the white balance process on the analog video signal, and the resulting signal is applied to the A/D converter 34. The A/D converter 34 analog-to-digital converts the received signal into the digital video signal, which is then supplied to the digital signal processor 35. The digital video signal supplied to the digital signal processor 35 is temporarily stored on the video RAM 43 via the control bus 36. The digital video signal temporarily stored on the video RAM 43 is supplied to the video signal generation processor 45 via the control bus 36 to be converted into the video signal. The video signal is then supplied to the LCD panel 46. The LCD panel 46 displays a video responsive to the video signal, namely, a video (moving image) containing the subject image.

The subject observation process is performed every frame second (for example, 1/60 second). The LCD panel 46 displays successively each frame image (still image) containing the subject image every frame second. The user thus determines the composition of the subject while observing the video on the LCD panel 46.

The user can execute the following photographing process by pressing the shutter button 40a after determining the composition of the subject.

The subject image captured through the imaging lens 31 is photoelectrically converted by the image pickup unit 32, and then applied to the analog signal processor 33, the A/D converter 34 and the digital signal processor 35 in that order for processing. As a result, the digital video signal is obtained. The digital video signal is then supplied to the video RAM 43 for temporary storage via the control bus 36. The process until now is basically identical to the subject observation process. During the photographing process, the digital video signal stored on the video RAM 43 is displayed on the LCD panel 46 as a still image in the same manner as in the subject observation process. In addition, the following process is performed.

The digital video signal stored on the video RAM 43 is also supplied to the digital signal processor 35 via the control bus 36 to be converted into compression encoded video data. The compression encoded video data is then supplied to the memory card 38 for storage via the control bus 36 and the I/O controller 37.

The process of the second program, namely, the playback process of the video by the digital camera 3, is described below.

The CPU 39 of FIG. 1 specifies a file to be played back (a JPEG file in this embodiment) by referencing directory information in the memory card 38 to be accessed. In response to the specification, the CPU 39 supplies a memory area corresponding to a file in the memory card 38 (compression encoded video data) to the digital signal processor 35 via the I/O controller 37 and the control bus 36. The digital signal processor 35 decodes the compression encoded video data into the original digital video signal, which is then supplied to the video RAM 43 for temporary storage via the control bus 36. The digital video signal temporarily stored on the video RAM 43 is supplied to the video signal generation processor 45 via the control bus 36. The video signal generation processor 45 processes the digital video signal into the video signal, which is then supplied to the LCD panel 46. The LCD panel 46 displays the video responsive to the video signal, namely, the video (still video or moving video) responsive to the file in the memory card 38 to be played back.

The process of the fifth program, namely, the process for controlling the display content of the LCD panel 46 as a display of the digital camera 3 is described below.

In the present embodiment, the digital camera 3 is provided with a function (hereinafter referred to as a help function) for displaying, on the LCD panel 46, an image (hereinafter referred to as a help menu) explaining an operational procedure of the digital camera 3. The fifth program embodies the help function. In other words, one of the functions of the fifth program is the help function. A process corresponding to the help function (hereinafter referred to as a help menu displaying process) is described below as one of the processes of the fifth program.

A top page of the help menu is displayed on the LCD panel 46 when the user operates one of the function buttons 40d, and the menu cursor command buttons and selection command buttons 40e. A series of operational steps performed by the user to display the top page of the help menu is referred to as a help menu displaying process. By operating the function buttons 40d, and the menu cursor command buttons and selection command buttons 40e, the user selects an selection item for desired information from among a plurality of selection items displayed on the top page of the help menu (i.e., presses a software button) and thus displays the help menu of the desired information on the LCD panel 46. A variety of selection items are arranged in each of a variety of help menus. The user repeatedly selects desired selection items by operating the function buttons 40d, and the menu cursor command buttons and selection command buttons 40e, and thus obtains the desired information. The help menu screen bearing the information desired by the user is displayed on the LCD panel 46.

In the present embodiment, the help menu displaying process is executed in response to the user operation performed on the function buttons 40d, and the menu cursor command buttons and selection command buttons 40e. The user operation to execute the help menu displaying process is not limited to the present embodiment. For example, the LCD panel 46 may be constructed of a touchpanel, and the help menu displaying process may be executed in response to an operation on the touchpanel.

Figure 11:
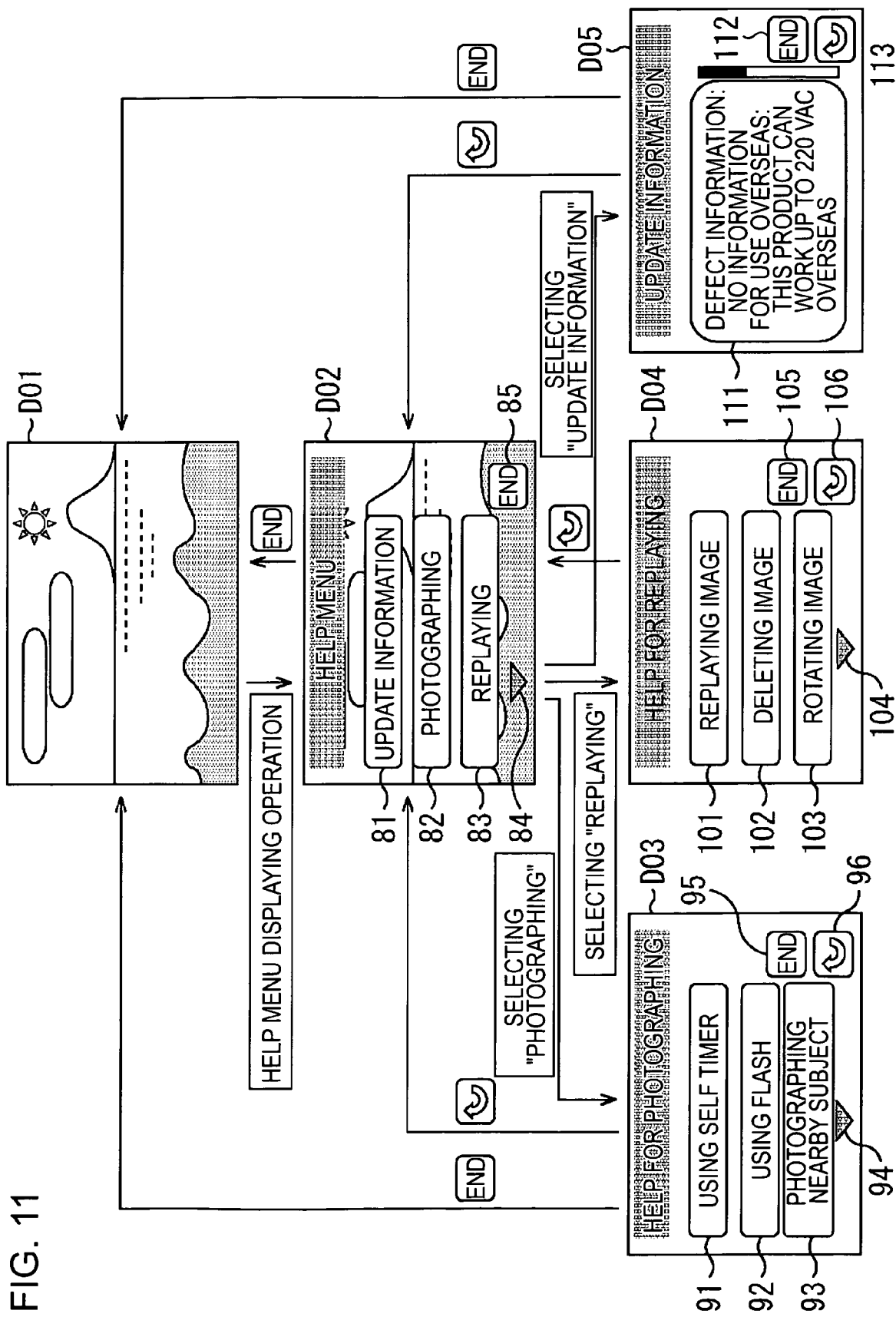
FIG. 11 illustrates a variety of images displayed in accordance with a help function of the digital camera of FIG. 1.

In the help menu displaying process, a variety of help menus is displayed on the LCD panel 46 as shown in FIG. 11. FIG. 11 diagrammatically illustrates the help menu displaying process, namely, a variety of help menus displayed in response to the user operation.

While the CPU 39 in the digital camera 3 of FIG. 1 performs the photographing process or the image playback process, the LCD panel 46 displays the image of the subject or the replayed image. The image displayed on the LCD panel 46 during the photographing process or the image playback process other than the help menu displaying process is referred to as an initial image in the discussion of the help menu displaying process. For example, an image D01 is displayed as the initial image on the LCD panel 46 as shown in FIG. 11.

If a help menu displaying process is performed with the initial image D01 being displayed on the LCD panel 46, an image D02 of FIG. 11 is displayed as a top page of the help menu on the LCD panel 46.

The top page D02 of the help menu includes a plurality of selection items (software buttons) 81 through 85. When the user selects a predetermined one of the software buttons, an image corresponding to the selection item selected by the user appears on the LCD panel 46.

For example, a selection item described as "photographing" is selected, an image D03 of FIG. 11 is displayed as a help menu relating to a photographing function on the LCD panel 46. The help menu D03 provides selection items for displaying help information relating to the photographing function. For example, the selection items on the help menu D03 include a selection item 91 for displaying help information (image) for "using self timer", a selection item 92 for displaying help information for "using flash", and a selection item 93 for displaying help information for "photographing nearby subject". If the LCD panel 46 is not so large enough to accommodate all selection items, a selection item 94 for scrolling the display of the selection items for selecting each piece of help information (hereinafter referred to as scroll item) is arranged. A selection item 95 for returning the display content of the LCD panel 46 to the initial image D01 (hereinafter referred to as ending item) is also arranged. A selection item 96 for returning the display content of the LCD panel 46 to an immediately preceding page (hereinafter referred to as return item), namely, the top page D02 of the help menu is also arranged.

When a "replaying" selection item 83 is selected from the top page D02 of the help menu, an image D04 of FIG. 11 is displayed as a help menu relating to the replay function on the LCD panel 46. The help menu D04 shows selection items for displaying help information relating to the replay function. The selection items in the help menu D04 include a selection item 101 for displaying help information for "replaying image", a selection item 102 for displaying help information for "deleting image", and a selection item 103 for displaying help information for "rotating image. Also included are a scroll item 104, an ending item 105, and a return item 106.

When an "update information" selection item 81 is selected from the top page D02 of the help menu, a image D05 containing the update information relating to the digital camera 3 (hereinafter referred to as update information image) is displayed on the LCD panel 46. More specifically, the LCD panel 46 displays the update information corresponding to the update information file of the model code of the digital camera 3, from among the model-based update information files and the language-based update information files stored on the information management server 1 of FIG. 1. A display area 111 is arranged in an update information image D05 as a display area for displaying the update information. Furthermore, an ending item 112 and a return item 113 are also arranged.

In the present embodiment, "P072JP" described on the top of the "model code to be transmitted" item of the management table of FIG. 6 is the model code of the digital camera 3. In the management table of FIG. 6, the file named "p072jp.jpg" is the update information file of the model code "P072JP" of the digital camera 3. The compression encoded video data contained in the file named "p072jp.jpg" is decompression decoded by the digital signal processor 35 of FIG. 1, and as a result, the image (and image data thereof) displayed on the display area 111 of FIG. 11 is obtained. The help menu D05 (and video data thereof) with the image inserted into the display area 111 is generated by the CPU 39 and then displayed on the LCD panel 46.

It should be noted that the update information file is a video format file in the present embodiment. In the digital camera 3 of FIG. 3 in accordance with the present embodiment, the character data of the symbols (codes) defined in JIS is stored in the flash memory 44 of FIG. 1. As previously discussed, from the cost reduction point of view, the character data of all symbols defined in JIS is not necessarily stored on the flash memory 44. The character data of only part of symbols may be stored on the flash memory 44. If the update information file is provided in a text file with the character data of the symbol ""あ"" not stored on the flash memory 44, the digital camera 3 cannot display the symbol ""あ"" of a message ""現在ありません"" (meaning currently not available) on the LCD panel 46. The user cannot visibly recognize the update information. In accordance with the present embodiment, for this reason, the update information file is supplied in a video format file, more specifically, in a JPEG file to the digital camera 3.

For the digital camera 3 to display the update information image D05 on the LCD panel 46, the update information file corresponding to the update information to be displayed on the display area 111 needs to be pre-stored on the flash memory 44 or the like. More specifically, in the present embodiment, the update information file is supplied from the information management server 1 to the client computer 2, and then stored on the storage unit 25 in the client computer 2 as previously discussed. The digital camera 3 needs to have retrieved the update information file from the client computer 2 at a predetermined timing.

The retrieval method and retrieval timing of the update information file are not limited to any particular ones. However, a process to retrieve the update information is preferably free from any aid of the user (such as any user operation involved), and free from notifying the user that the process is in progress, and stopping a different process to perform that process, and interrupting a user's current operation. The retrieval method and retrieval timing of the update information file are preferably determined in a manner free from any aid of the user (such as any user operation involved), and free from notifying the user that the process is in progress, and stopping a different process to perform that process, and interrupting a user's current operation.

The user may connect the digital camera 3 to the client computer 2 for the purpose of transferring image different from the purpose of retrieving the update information. In this case, the digital camera 3 automatically (with no aide from the user) performs a pre-process for performing a communication of that purpose (hereinafter referred to as communication initialization process), and then retrieves the update information file from the client computer 2 in a process within the communication initialization process.

The communication initialization process is the pre-process prior to the intended purpose, namely, communication. Even if the process to retrieve the update information is performed as the pre-process, the process goes unnoticed from the user, and the other process (the originally intended process such as communication) and the user operation are not interrupted by the pre-process. When the digital camera 3 is connected to the client computer 2, the communication initialization process automatically starts (without any aid from the user), and the process to retrieve the update information performed as part of the communication initialization process does not involve the aid from the user (user operation).

FIG. 12 is a flowchart of the communication initialization process containing the process to retrieve the update information. More specifically, FIG. 12 is the flowchart illustrating the communication initialization process in accordance with one embodiment of the present invention. The communication initialization process of FIG. 12 is part of the process of the above-described fourth program. The communication initialization process as the process of the fourth program is described below with reference to FIG. 12.

The flowchart on the left portion of FIG. 12 illustrates the communication initialization process of the digital camera 3 while the flowchart of the right portion of the FIG. 12 illustrates the communication initialization process of the client computer 2. An arrow-headed line is drawn from one step to another step between the flowcharts on the left portion and the right portion of FIG. 12 and means a flow of information (data). More specifically, one arrow-headed line means that information transmitted from one of the client computer 2 and the digital camera 3 to the other in the first step is received by the other in the second step.

When the I/O controller 28 in the client computer 2 is electrically connected to the I/O controller 37 in the digital camera 3 via the USB cable or the like, the communication initialization process automatically starts. Subsequent to the connection, processing proceeds to step S1.

In step S1, the CPU 39 in the digital camera 3 reads the model code thereof from the flash memory 44, and transmits the model code from the I/O controller 37 to the client computer 2. The USB standard, specifying that any model code be transmitted at connection, is simply followed.

In step S11, the CPU 21 in the client computer 2 receives the model code via the I/O controller 28.

As shown in the management table of FIG. 6, the model code transmitted and then received includes not only information identifying the product model of the digital camera 3 but also information identifying the set language of the digital camera 3. More specifically, "P072JP" listed on top of the "model code to be transmitted" item of the management table of FIG. 6 is the model code of the digital camera 3. Information "P072" of "P072JP" is information identifying "DSC-P72" as the model code of the digital camera 3. Information "JP" of "P072JP" identifies that the language set in the digital camera 3 is Japanese (JP).

In step S12, the CPU 21 in the client computer 2 searches the storage unit 25 for the file. Based on the search results, the CPU 21 in the client computer 2 determines in step S13 whether the update information file corresponding to the product model and the language identified by the model code received in step S11 is present.

If the CPU 21 in the client computer 2 determines in step S13 that the update information is not present, the communication initialization process of the client computer 2 ends. As will be described later in this case, the answer to the determination in step S2 on the digital camera 3 is no, and the communication initialization process of the digital camera 3 also ends. If the update information file corresponding to the model code of the digital camera 3 is not stored in the storage unit 25 in the client computer 2, no update information file is transferred to the digital camera 3.

In the present embodiment, the model code of the digital camera 3 is "P072JP". The storage unit 25 stores the update information file of all names described in the "display file of corresponding 'update information'", item of the management table of FIG. 6. The update information file having the name "p072jp.jpg" corresponding to "P072JP" is thus stored in the storage unit 25. If it is determined in step S13 that the update information file is present, processing proceeds to step S14.

In step S14, the CPU 21 in the client computer 2 transmits, from the I/O controller 28 to the digital camera 3, a request to transfer the update information file (hereinafter referred to as a file transfer request).

In step S2, the CPU 39 in the digital camera 3 determines whether the file transfer request has been made.

If the client computer 2 ends the communication initialization process after determining that the answer to the determination in step S13 is no, the digital camera 3 determines in step S2 that the file transfer request has not been made, and also ends the communication initialization process.

If the client computer 2 transmits the file transfer request in step S14 after determining that the answer to the determination in step S13 is yes, the CPU 39 in the digital camera 3 receives the file transfer request via the I/O controller 37. In step S2, the CPU 39 in the digital camera 3 determines that the file transfer request has been made, and proceeds to step S3.

In step S3, the CPU 39 in the digital camera 3 transmits a reply "file reception process to be performed" to the client computer 2 via the I/O controller 37 in response to the file transfer request.

In step S15, the CPU 21 in the client computer 2 determines whether a file transmission is enabled.

If the digital camera 3 is in trouble (not shown in FIG. 12), a reply "file reception process not to be performed" may be transmitted in response to the file transfer request and the digital camera 3 may end the communication initialization process, or the digital camera 3 ends the communication initialization process without transmitting the reply. In such a case, the CPU 21 in the client computer 2 determines in step S15 that file transmission is not possible, and ends the communication initialization process.

In this case, since the reply "file reception process to be performed" is transmitted from the digital camera 3 in step S3, the CPU 21 in the client computer 2 receives the reply via the I/O controller 28, determines that the file transmission is enabled, and proceeds to step S16.

In step S16, the CPU 21 in the client computer 2 reads, from the storage unit 25, the update information file corresponding to the model code of the digital camera 3 received in step S11, namely, the update information file having the name "p072jp.jpg" listed in the management table of FIG. 6, and transmits the read update information file to the digital camera 3 via the I/O controller 28. In this way, the communication initialization process of the client computer 2 ends.

The CPU 39 in the digital camera 3 receives the update information file via the I/O controller 37 in step S4 and causes the flash memory 44 to store the update information file in step S5. The communication initialization process of the digital camera 3 thus ends.

Each time the user electrically connects the client computer 2 to the digital camera 3 via the USB cable or the like for the purpose of transferring image, the above-described communication initialization process is automatically performed. The update information file is automatically stored on the flash memory 44 of the digital camera 3. With the help function, the user can cause the update information image D05 of FIG. 11 to be displayed on the LCD panel 46, and visibly recognize the update information by viewing the display area 111.

Even with the communication initialization process performed in this way, the update information file cannot be stored on the flash memory 44 of the digital camera 3 if the update information file itself is not stored on the client computer 2. If the update information file is not stored on the flash memory 44 of the digital camera 3, the digital camera 3 cannot display the update information image, such as the image D05 of FIG. 11, on the LCD panel 46 even if the "update information" selection item 81 is selected with the top page D02 of the help menu of FIG. 11 displayed on the LCD panel 46. Furthermore, if an image D05 with nothing contained in the display area 111 of FIG. 11 (a monochrome blank image) is displayed on the LCD panel 46, such an image D05 having the update information is meaningless to the user.

Figure 13:
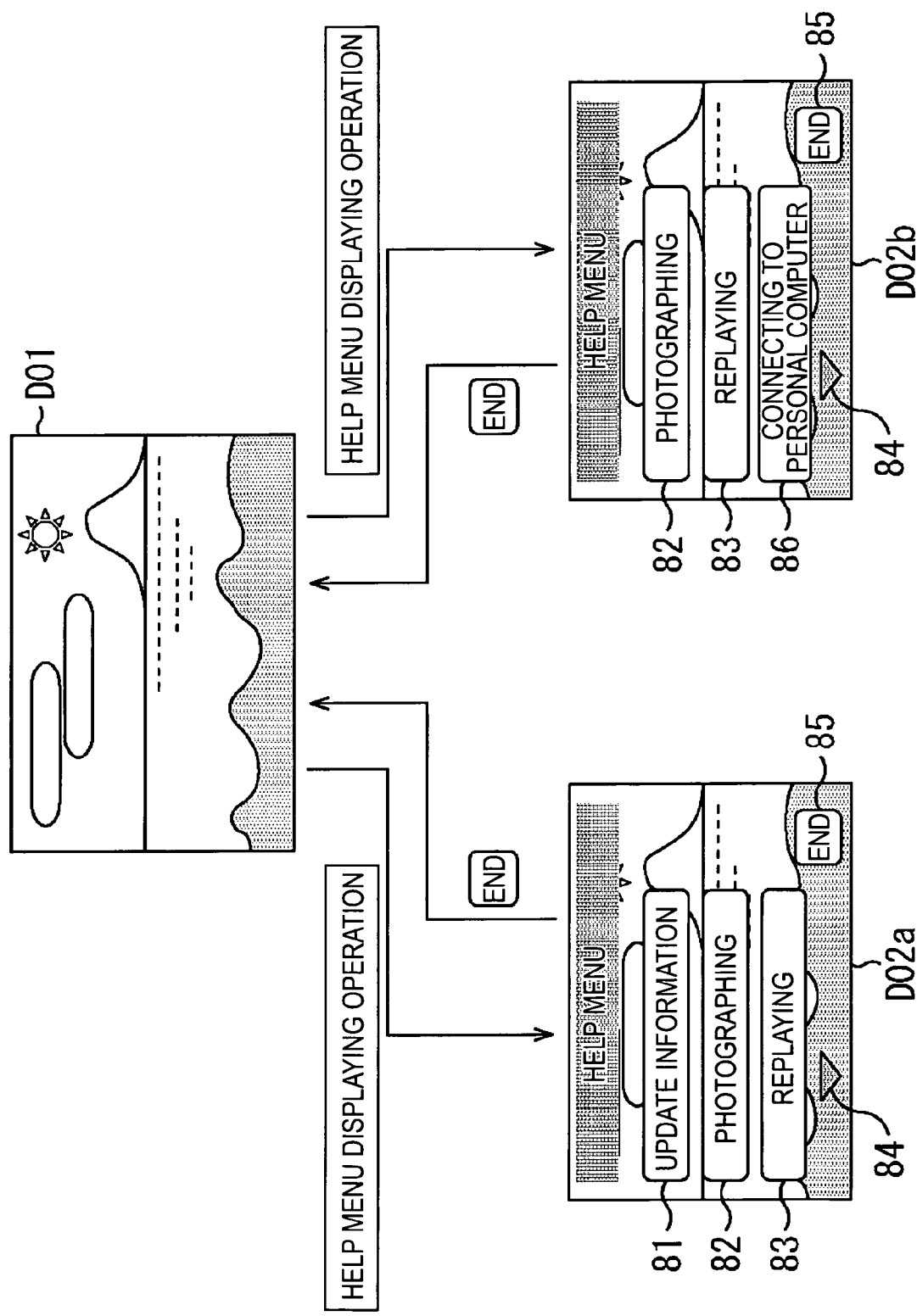
FIG. 13 illustrates a top page of a help menu displayed in accordance with the help function of the digital camera of FIG. 1.

A help menu displaying process is now performed with the initial image D01 displayed on the LCD panel 46 as shown in FIG. 13. If the digital camera 3 stores the update information file on the flash memory 44, the LCD panel 46 displays the selection item 81 for displaying the update information image, namely, the help menu top page D02a containing the update information selection item 81. If the flash memory 44 does not store the update information file, the LCD panel 46 displays a help menu top page D02b containing no update information selection item 81. Since the help menu top page D02b contains no update information selection item 81, a "connecting to personal computer" selection item 86 is initially displayed instead.

Figure 14:
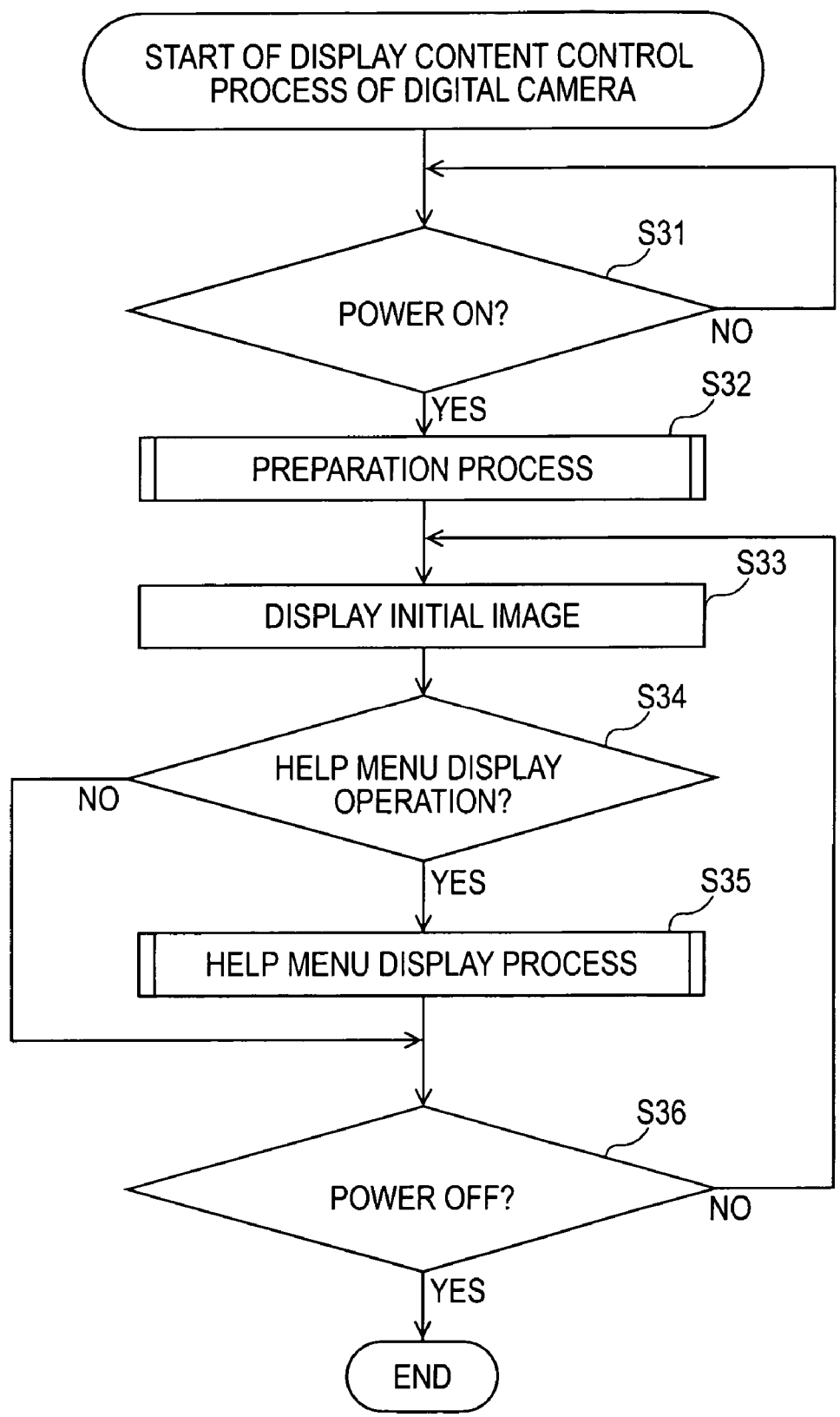
FIG. 14 is a flowchart illustrating a display content control process performed by the digital camera of FIG. 1.

The process of the fifth program is described below with reference to a flowchart of FIG. 14. The process of the fifth program includes the help menu displaying process for selectively using help menu top pages D02a and D02b. The process of the fifth program is a control process for controlling the display content of the LCD panel 46 as a display of the digital camera 3, and is hereinafter referred to as a display content control process. FIG. 14 is the flowchart of the display content control process of the digital camera 3. The flowchart of FIG. 14 focuses on the help function, namely, the process for displaying the help menu. FIG. 14 omits the process for performing functions, other than the help function, namely, a setting function for displaying, on the LCD panel 46, a setting screen for setting a variety of parameters on the LCD panel 46.

In step S31, the CPU 39 in the digital camera 3 determines whether power is on.

If it is determined in step S31 that power is off rather than on, step S31 is repeated to determine whether power is on. As long as power is off, step S31 is repeated, and the display content control process must wait on standby. The flash memory 44 shows nothing on the screen thereof.

If power is on in response to the selection of the power switch button 40b of FIG. 7, the CPU 39 determines in step S31 that power is on. Processing proceeds to step S32.

In preparation for the help menu displaying process, the CPU 39 determines in step S32 which of the help menu top pages D02a and D02b of FIG. 13 to use, more precisely, performs a process for setting information required to perform that determination (setting information present flag). The process in step S32 is referred to as a preparation process.

Figure 15:
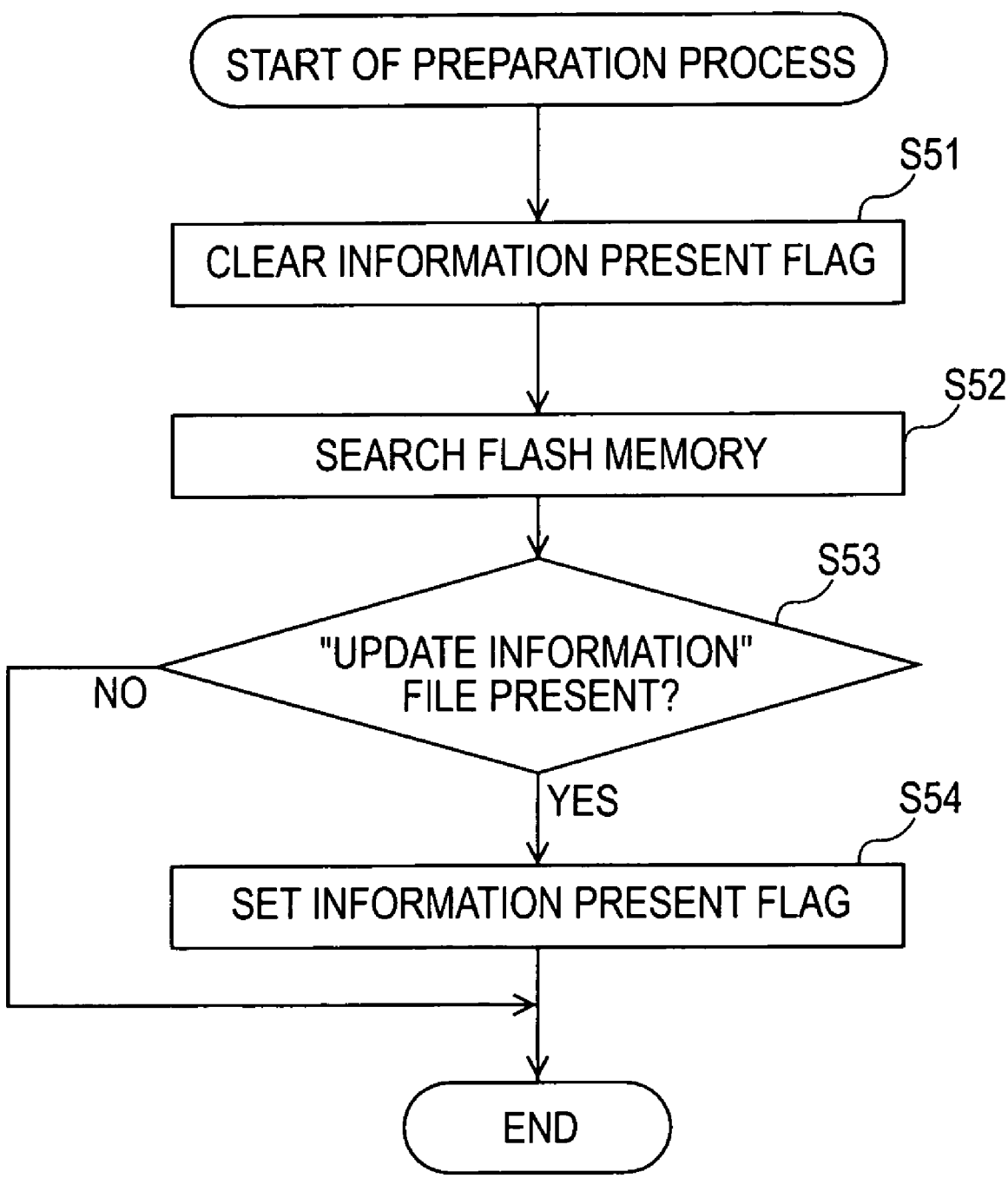
FIG. 15 is a flowchart illustrating a pre-process step in the display content control process of FIG. 14.

The preparation process will be described later in more detail with reference to a flowchart of FIG. 15.

Subsequent to the preparation process in step S32, the CPU 39 proceeds to step S33. In step S33, the CPU 39 controls to display the initial image, such as the initial image D01 of FIGS. 11 and 13, on the LCD panel 46.

In step S34, the CPU 39 determines whether a help menu displaying process is to be performed.

If it is determined in step S34 that a help menu displaying process is not to be performed, the CPU 39 proceeds to step 36 without performing the help menu displaying process in step S35.

In step S36, the CPU 39 determines whether power is off.

If it is determined in step S36 that power is off, the display content control process ends. In other words, if power is back on again, the display content control process is initiated.

As long as power is on, it is determined in step S36 that power is not off, and processing returns to step S33. The initial image is displayed again on the LCD panel 46 and subsequent steps are repeated. Steps S33 through S36 are looped as shown in FIG. 14 as long as power is on and the help menu displaying process is to be performed. The initial image continuously remains displayed on the LCD panel 46.

In practice, however, functions such as the setting function other than the help function are incorporated. If a command to use such functions is issued by the user, a variety of images responsive to the command are displayed on the LCD panel 46.

If the help menu displaying process is performed while steps S33 through S36 are looped, namely, the initial image is continuously displayed, the CPU 39 determines that the answer to the determination in step S36 is yet. This means that the CPU 39 that the help menu displaying process has been made in step S35. The help menu displaying process will be described later in more detail with flowcharts of FIGS. 16 and 17.

The preparation process in step S32 is described in more detail with reference to FIG. 15, and then, the help menu displaying process in step S35 will be described with reference to flowcharts of FIGS. 16 and 17.

In step S51 of FIG. 15, the CPU 39 in the digital camera 3 of FIG. 1 clears a flag (hereinafter referred to as information present flag) indicating whether the update information file is stored on the internal memory (flash memory 44 of the digital camera 3 in this embodiment).

In step S52, the CPU 39 searches the flash memory 44 as the internal memory. In step S53, the CPU 39 determines based on the search result whether the update information file is available in the flash memory 44.

If the search result in step S52 shows that the flash memory 44 does not store the update information file, the answer to the determination in step S53 is no, and the preparation process ends. More specifically, the process in step S32 of FIG. 14 ends. The initial image is displayed on the LCD panel 46 in step S33, and subsequent steps are then performed.

If the search result in step S52 shows that the flash memory 44 stores the update information file, the answer to the determination in step S53 is yes. Processing proceeds to step S54. In step S54, the CPU 39 sets an information present flag. The preparation process thus ends. More specifically, the process in step S32 of FIG. 14 ends. The initial image is displayed on the LCD panel 46 in step S33, and subsequent steps are then performed.

In the preparation process of the present embodiment, the information present flag is set or cleared depending on whether the update information file is stored on the flash memory 44.

If the information present flag is set in the help menu displaying process in step S35 of FIG. 14, the CPU 39 displays the top page D02a of the help menu of FIG. 13. If the information present flag is cleared, the top page D02b of the help menu of FIG. 13 is displayed.

The help menu displaying process for selectively displaying the top pages D02a and D02b of the help menu is described below with reference to the flowchart of FIGS. 16 and 17.

The top page D02a of the help menu of FIG. 13 is hereinafter referred to as an "update information" item displayed help menu D02a. The top page D02b of the help menu of FIG. 13 is hereinafter referred to as an "update information" item undisplayed help menu D02b. The "photographing" selection item 82, the "replaying" selection item 83, and the "connecting to personal computer" selection item 86 are collectively referred to as other help items. The screen D03 and D04 of FIG. 11 are thus referred to as other help item screens.

Figure 16:
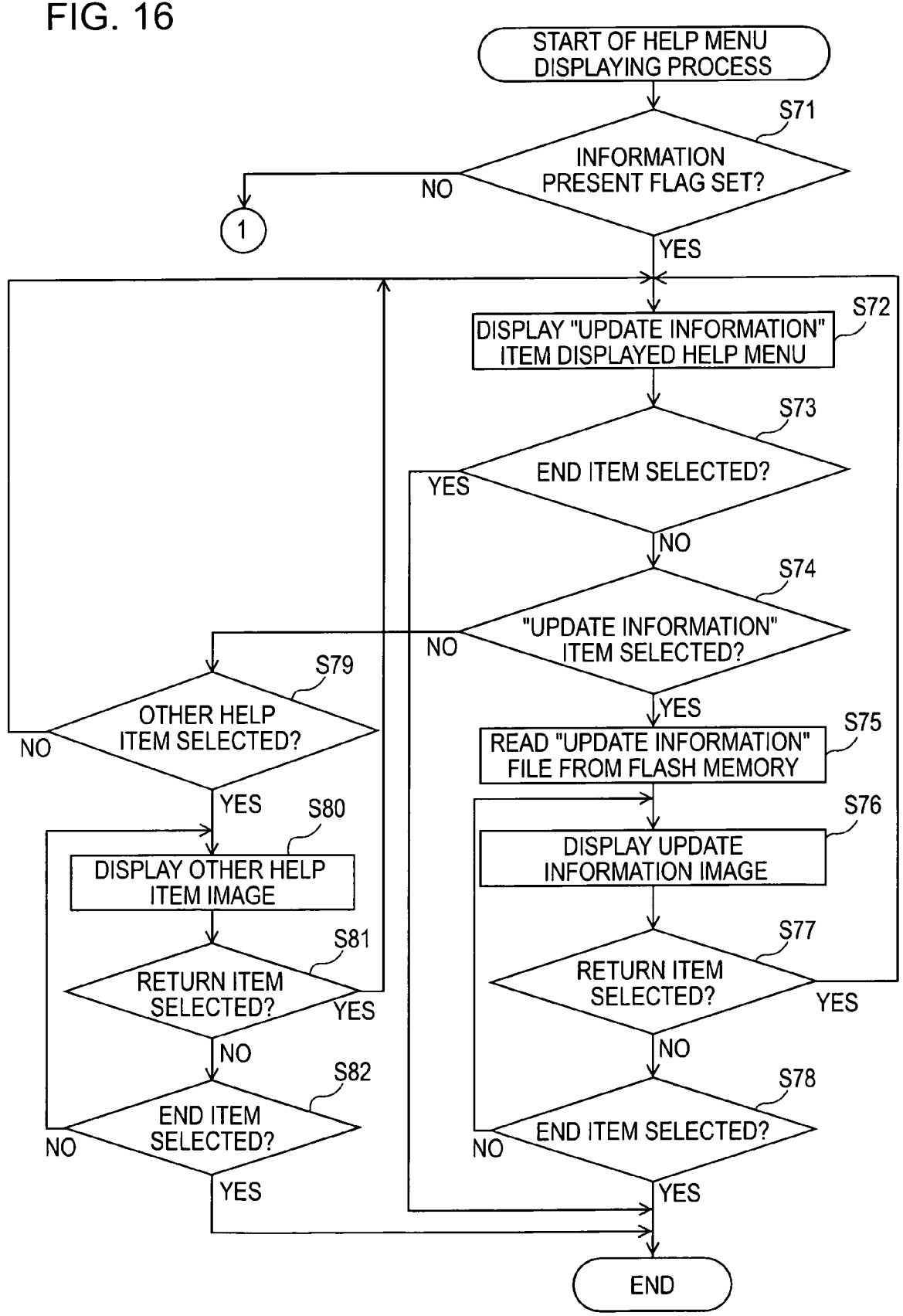
FIG. 16 is a flowchart illustrating in detail a help menu display step of the display content control process of FIG. 14.

In step S71 of FIG. 16, the CPU 39 determines whether the information present flag has been set.

Figure 17:
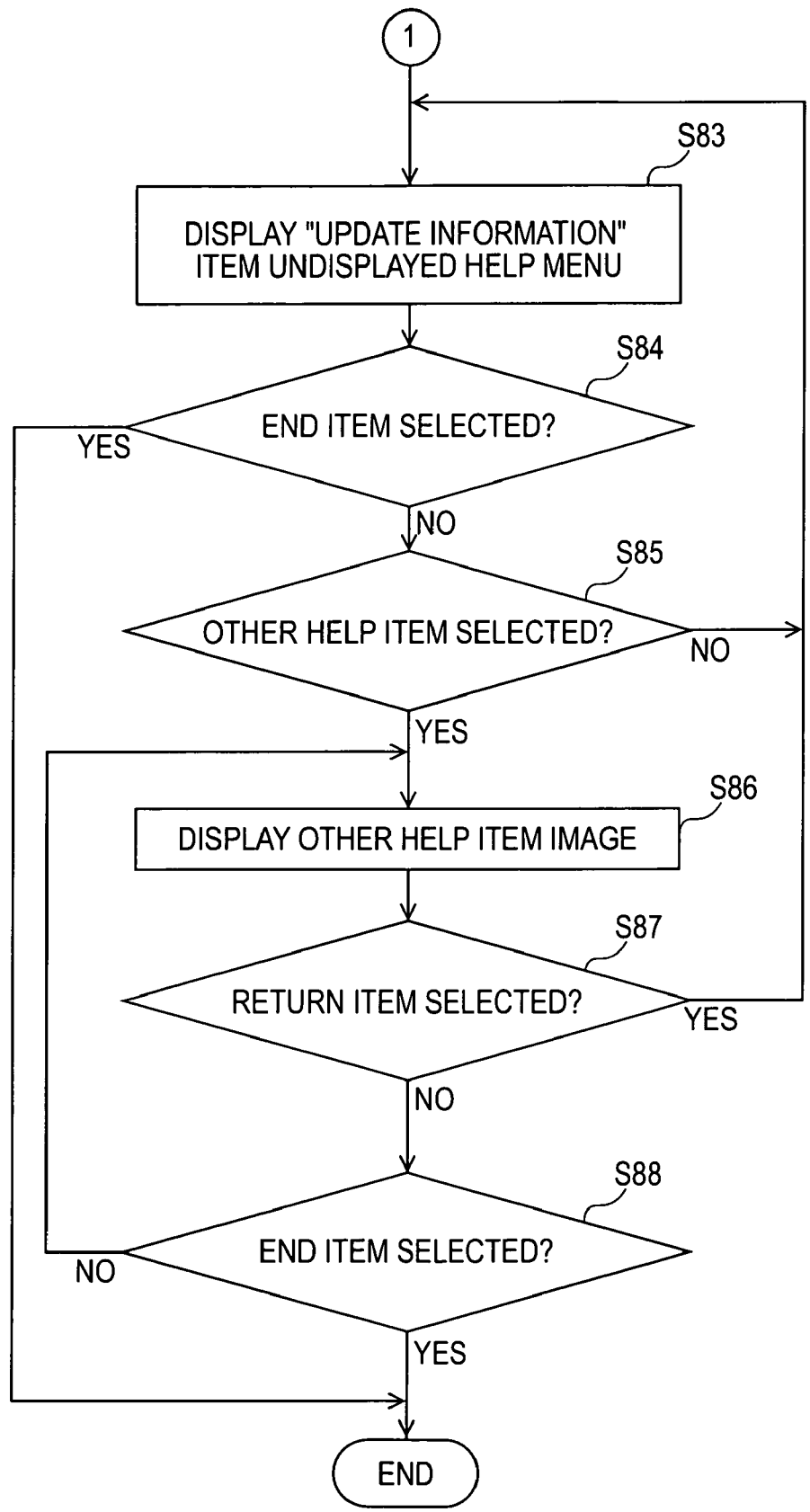
FIG. 17 is a flowchart illustrating in detail the help menu display step in the display content control process of FIG. 14.

If it is determined in step S71 that the information present flag has not been set, namely, the information present flag has been cleared, processing proceeds to step S83 of FIG. 17. Step S83 and subsequent steps will be described later.

If it is determined in step S71 that the information present flag has been set, processing proceeds to step S72. In step S72, the CPU 39 controls to display the "update information" item displayed help menu D02a on the LCD panel 46.

In step S73, the CPU 39 determines whether the ending item 85 has been selected.

If it is determined in step S73 that the ending item 85 has been selected, the help menu displaying process ends. As long as power continuously remains on with the process in step S35 of FIG. 4 ended, the CPU 39 determines in step S36 that the answer to the determination in step S36 is no, and returns to step S33. The initial image D01 of FIG. 13 is displayed again on the LCD panel 46 in step S33 and subsequent steps are repeated.

If it is determined in step S73 that the ending item 85 has not been selected, processing proceeds to step S74.

In step S74, the CPU 39 determines whether the "update information" selection item 81 has been selected.

If it is determined in step S74 that the "update information" selection item 81 has been selected, processing proceeds to step S75. In step S75, the CPU 39 reads the update information file from the flash memory 44, and generates the update information image D05 (video data) of FIG. 11. In step S76, the CPU 39 controls to display the update information image D05 on the LCD panel 46.

In step S77, the CPU 39 determines whether the return item 113 of the update information image D05 has been selected.

If it is determined in step S77 that the return item 113 of the update information image D05 has been selected, processing returns to step S72. The "update information" item displayed help menu D02a of FIG. 13 is displayed again on the LCD panel 46 in step S72 and then subsequent steps are repeated.

If it is determined in step S77 that the return item 113 of the update information image D05 has not been selected, processing proceeds to step S78. In step S78, the CPU 39 determines whether the ending item 112 of the update information image D05 has been selected.

If it is determined in step S78 that the ending item 112 of the update information image D05 has been selected, the help menu displaying process ends. As long as power continuously remains on with the process in step S35 of FIG. 4 ended, the CPU 39 determines that the answer to the determination in step S36 is no, and returns to step S33. The initial image D01 of FIG. 13 is displayed again on the LCD panel 46 in step S33 and then subsequent steps are repeated.

If it is determined in step S78 that the ending item 112 of the update information image D05 has not been selected, processing returns to step S76 to repeat step S76 and subsequent steps. More specifically, the update information image D05 is continuously displayed on the LCD panel 46.

The series of process steps subsequent to the determination in step S74 that the "update information" selection item 81 is selected from the "update information" item displayed help menu D02a of controller 13 has been discussed.

A series of process steps to be performed subsequent to the determination in step S74 that the "update information" selection item 81 has not been selected is described below. In this case, processing proceeds to step S79. In step S79, the CPU 39 determines whether another help item has been selected from the "update information" item displayed help menu D02a of FIG. 13, namely, whether one of the "photographing" selection item 82, the "replaying" selection item 83, etc. has been selected.

If it is determined in step S79 that the other help item has not been selected, processing returns to step S72 to repeat step S72 and subsequent steps. More specifically, the "update information" item displayed help menu D02a is continuously displayed on the LCD panel 46.

If it is determined in step S79 that the other help item has been selected, processing proceeds to step S80. In step S80, the CPU 39 controls to display the image of the other help item on the LCD panel 46.

The CPU 39 determines in step S81 whether the return item in the other help items has been selected.

If it is determined in step S81 that the return item of the other help items has been selected, processing returns to step S72. The "update information" item displayed help menu D02a of FIG. 13 is displayed again on the LCD panel 46 in step S72, and then subsequent steps are repeated.

If it is determined in step S81 that the return item of the other help items has not been selected, processing proceeds to step S82. In step S82, the CPU 39 determines whether an ending item of the other help items has been selected.

If it is determined in step S82 that the ending item of the other help items has been selected, the help menu displaying process ends. As long as power continuously remains on with the process in step S35 of FIG. 4 ended, the CPU 39 determines that the answer to the determination in step S36 is no. Processing returns to step S33 to display the initial image D01 of FIG. 13 again on the LCD panel 46, and subsequent steps are repeated.

If it is determined in step S82 that the ending item of the other help items has not been selected, processing returns to step S80 to repeat step S80 and subsequent steps. More specifically, the image of the other help item is continuously displayed on the LCD panel 46.

The series of process steps subsequent to the determination in step S71 that the information present flag has been set, namely, the determination step S72 that the "update information" item displayed help menu D02a of FIG. 13 is displayed on the LCD panel 46 and subsequent process steps have been discussed.

A series of process steps subsequent to the determination in step S71 that the information present flag is not set, namely, the information present flag is cleared, is described below. Steps S83 through S88 of FIG. 17 are executed.

In step S83, the CPU 39 controls to display the "update information" item undisplayed help menu D02b of FIG. 13 on the LCD panel 46.

In step S84, the CPU 39 determines whether the ending item 85 has been selected.

If it is determined in step S84 that the ending item 85 has been selected, the help menu displaying process ends. As long as power continuously remains on with the process in step S35 of FIG. 4 ended, the CPU 39 determines that the answer to the determination in step S36 is no, and returns to step S33. The initial image D01 of FIG. 13 is displayed again on the LCD panel 46 in step S33, and subsequent steps are then repeated.

If it is determined in step S84 that the ending item 85 has not been selected, processing proceeds to step S85.

In step S85, the CPU 39 determines whether another help item has been selected from the "update information" item undisplayed help menu D02b of FIG. 13, namely, whether one of the "photographing" selection item 82, the "replaying" selection item 83, the "connecting to personal computer" selection item 86, etc. has been selected.

If it is determined in step S85 that the other help item has not been selected, processing returns to step S83 to repeat step S83 and subsequent steps. More specifically, the "update information" item undisplayed help menu D02b is continuously displayed on the LCD panel 46.

If it is determined in step S85 that the other help item has been selected, processing proceeds to step S86. In step S86, the CPU 39 controls to display the image of the other help item on the LCD panel 46.

In step S87, the CPU 39 determines whether the return item of the other help item image has been selected.

If it is determined in step S87 that the return item in the other help item image has been selected, processing returns to step S83. In step S83, the "update information" item undisplayed help menu D02b of FIG. 13 is displayed again on the LCD panel 46 and then subsequent items are repeated.

If it is determined in step S87 that the return item in the other help item image has not been selected, processing proceeds to step S88. In step S88, the CPU 39 determines whether the ending item in the other help item image has been selected.

If it is determined in step S88 that the ending item in the other help item image has been selected, the help menu displaying process ends. As long as power continuously remains on with the process in step S35 of FIG. 4 ended, the CPU 39 determines that the answer to the determination in step S36 is no, and returns to step S33. The initial image D01 of FIG. 13 is displayed again on the LCD panel 46 in step S33, and subsequent steps are repeated.

If it is determined in step S88 that the ending item in the other help item image has not been selected, processing returns to step S86 to repeat step S86 and subsequent steps. More specifically, the other help item image is continuously displayed on the LCD panel 46.

The help menu displaying process of FIGS. 16 and 17 has been described as the detailed process in step S35 of FIG. 14.

When the CPU 39 in the digital camera 3 executes the help menu displaying process in this way, the update information of the product model of the digital camera 3 is displayed on the LCD panel 46.

In the above discussion, the information displayed on the LCD panel 46 is the update information relating to the product model of the digital camera 3. The information displayed on the LCD panel 46 can be any type of information as long as the information is unique to the product model of the digital camera 3.

In this case, a file containing the information unique to the product model of the digital camera 3 is managed in the information management server 1 of FIG. 1, and downloaded to the storage unit 25 in the client computer 2 as necessary. When the client computer 2 is connected to the digital camera 3 via the I/O controller 28 and the I/O controller 37, a process substantially identical to the above-described communication initialization process of FIG. 12 is performed. The file containing the information unique to the product model of the digital camera 3 is transferred from the client computer 2 to the digital camera 3 to be stored onto the flash memory 44.

The digital camera 3 has the following first through third advantages.

In the known techniques, the user must perform a complex and timing-consuming operation, such as searching support information unique to a product by operating a client computer. In accordance with the present embodiment, the user simply connects the digital camera 3 to the client computer 2 to automatically download the information unique to the digital camera 3 to the digital camera 3. The user can retrieve the product-model unique information by performing a simple operation using the digital camera 3 (such as a selection operation of the update information item). As a result, an operational workload on the user is substantially less than in the known art. This is the first advantage.

The manufacturer of the digital camera 3 simply causes the product-model unique information of the digital camera 3 to be stored on the information management server 1. The client computer 2 of the user automatically downloads the product-model unique information, and transfers the product-model unique information to the digital camera 3 via the external connection terminal. As a result, the user enjoys an increased chance of viewing the product-model unique information of the digital camera 3 in comparison with the product-model unique information of the known digital camera. This is the second advantage.

Once the product-model unique information of the digital camera 3 is downloaded to the digital camera 3, the product-model unique information remains stored on the digital camera 3 even if the digital camera 3 is disconnected from the client computer 2. With this arrangement, the digital camera 3 is free from such an inconvenience of the Internet that browsing cannot performed when an Web access is disconnected. More specifically, once the product-model unique information is downloaded, the user can view the product-model unique information any time. This is the third advantage.

A file containing the product-model unique information of the digital camera 3 is not limited to any particular file format as the update information file is not limited to any particular file format. As previously discussed, the character data to be stored on the flash memory 44 is typically limited in volume, and a video format file such as JPEG is preferable. Because the following fourth and fifth advantages are also provided in addition to the first through third advantages.

The manufacturer of the digital camera 3 simply causes the product-model unique information of the digital camera 3 in a video format file to be stored on the information management server 1. With this arrangement, the digital camera 3, which also can store the required character data as the known digital camera can, is manufactured. More specifically, the digital camera 3 is free from the requirement of loading all character data thereon. This is the fourth advantage.

The product-model unique information of the digital camera 3 is composed of the above-referenced symbol string. If the information is composed of a video format file, the symbol string thereof is handled as an image. The product-model unique information of the digital camera 3 includes not only the symbol string (text) but also illustrations and photographs (the use of HTML files is not necessary). This is the fifth advantage.

The above series of process steps is based on the premise that the update information file is a video format file. As previously discussed with reference to FIG. 4, the digital camera 3 needs to cause the update information to be correctly displayed on the LCD panel 46 even if the character data of one or more symbols of at least one symbol forming the update information is not stored. To this end, the video format file is adopted as the update information file. If the character data of all of at least one symbol forming the update information is stored on the digital camera 3, the digital camera 3 can cause the update information to be displayed on the LCD panel 46 even if the update information file is a text file.

The information management server 1 of FIG. 1 can prepare in advance and manage both the video format file and the text file as the update information file of a predetermined product model at a predetermined language. In this case, the client computer 2 downloads both the video format file and the text file as the update information file of the predetermined product model at the predetermined language to store both the video format file and the text file on the storage unit 25 as necessary. Depending on the storage status of the character data of the digital camera 3, the client computer 2 transmits either the video format file or the text file as the update information file of the predetermined product model at the predetermined language.

More specifically, the controller 13 in the information management server 1 of FIG. 1 manages the management table of FIG. 18 instead of the management table of FIG. 6. The controller 13 causes the update information file database 12 to store a video format file having a name listed in an update information display file of the management table of FIG. 18 and a text file having a name listed in an update information text file of the management table of FIG. 18.

FIG. 18 illustrates the management table of the update information file different from the management table of FIG. 6. The items listed in the management table of FIG. 18 are identical to the items listed in the management table of FIG. 6 except the update information text file, and the discussion thereof is omitted herein.

The update information text file item of FIG. 18 lists names of text files out of the update information files relating to the digital cameras identified by the model codes listed on the "model code to be transmitted" item on the left of the update information text file item. More specifically, the update information file having the name "p072jp.txt" listed on the top of the table of FIG. 18 relates to the digital camera having the model code "P072JP", namely the digital camera having Japanese (JP) set therewithin from among the digital cameras having the product model of "DSC-P72". The update information file is a text file in which a symbol forming the update information described in Japanese (JP) is described in code corresponding to Japanese Industrial Standard (JIS).

The language-based and model-based update information files of the digital cameras are stored on the update information file database 12 in the information management server 1 as the video format file and the text file.

The controller 13 in the information management server 1 controls to transmit, to the client computer 2 via the network 4, at least part of the language-based and model-based update information files of the digital cameras (both the corresponding text file and the corresponding video format file for the same update information).

More specifically, as at least part of the language-based and model-based update information files of the digital cameras for the same update information, both the corresponding text file and the corresponding video format file are supplied from the information management server 1 to the client computer 2 via the network 4. For example, all video format files having the names thereof listed in the update information display files of the management table of FIG. 18 (hereinafter referred to as update information video files) and all text files having the names thereof in the update information text file of the management table of FIG. 18 (hereinafter referred to as update information text files) are supplied together with the management table of FIG. 18 from the information management server 1 to the client computer 2 for storage on the storage unit 25.

Figure 19:
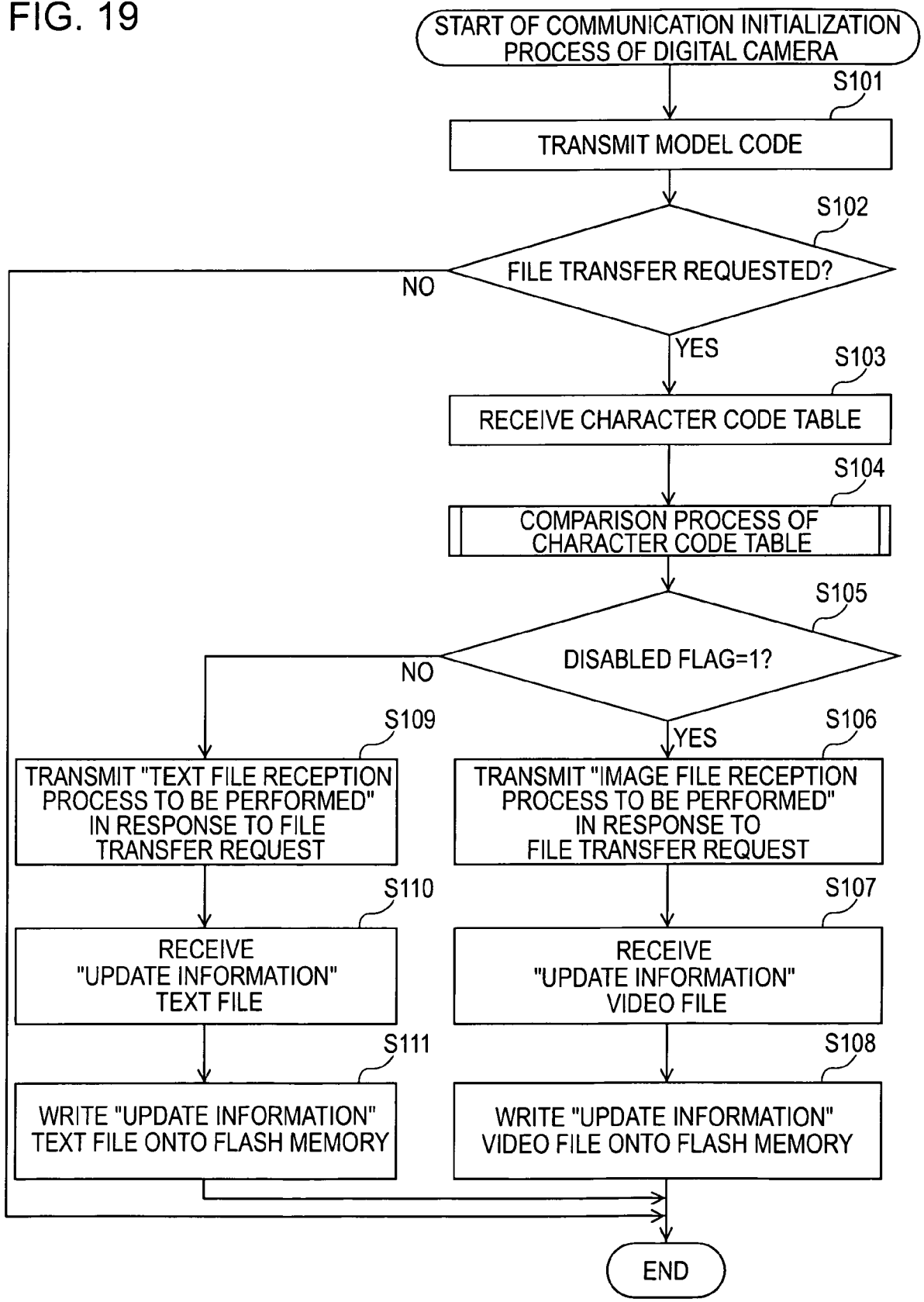
FIG. 19 is a flowchart, different from the flowchart of FIG. 12, for the communication initialization process of the digital camera of FIG. 1.
Figure 20:
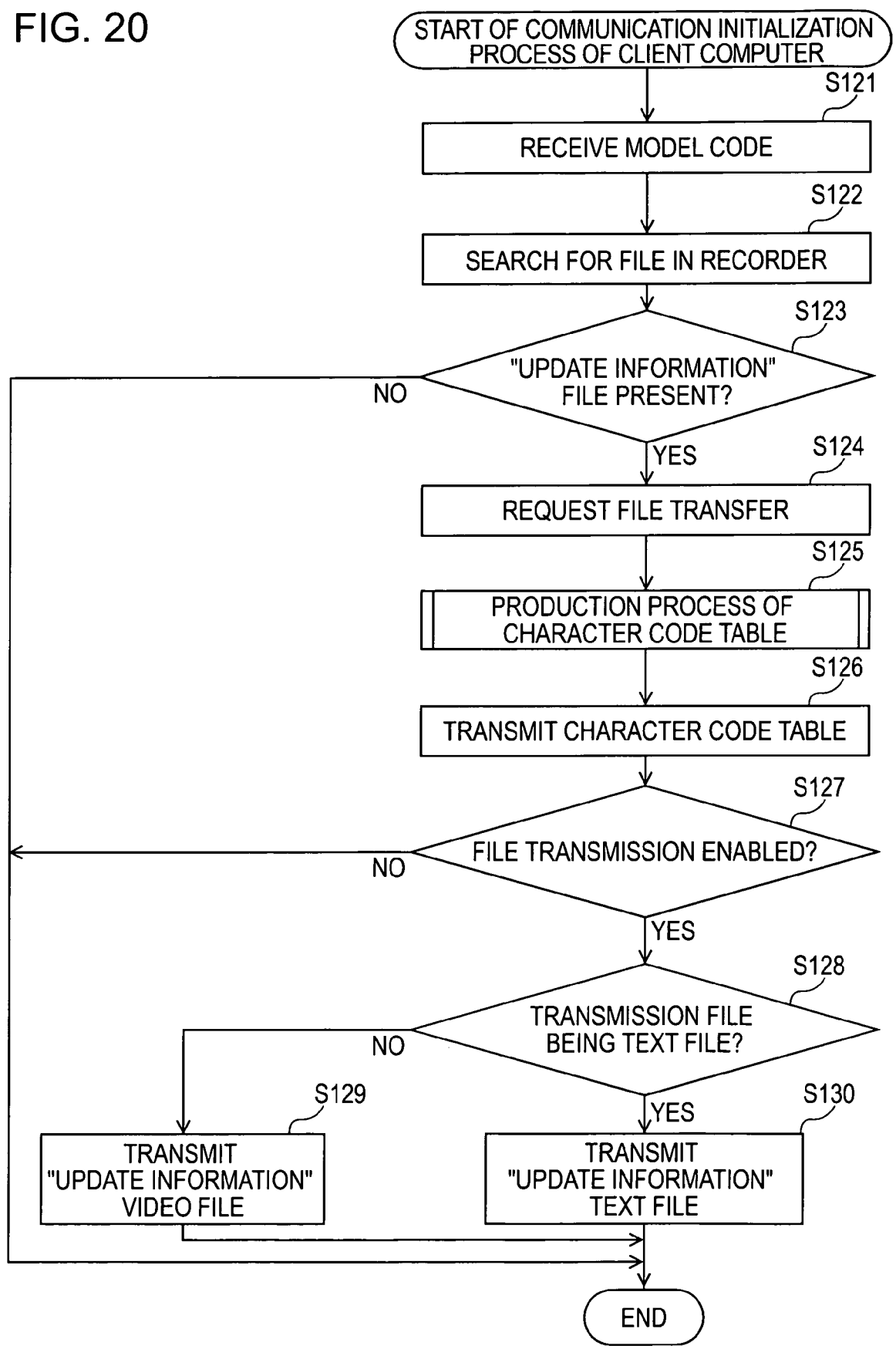
FIG. 20 is a flowchart, different from the flowchart of FIG. 12, for a communication initialization process of a client computer of FIG. 1.

The digital camera 3 and the client computer 2 perform the communication initialization process in accordance with flowcharts of FIG. 19 and FIG. 20, respectively, instead of the flowchart of FIG. 12.

Figure 21:
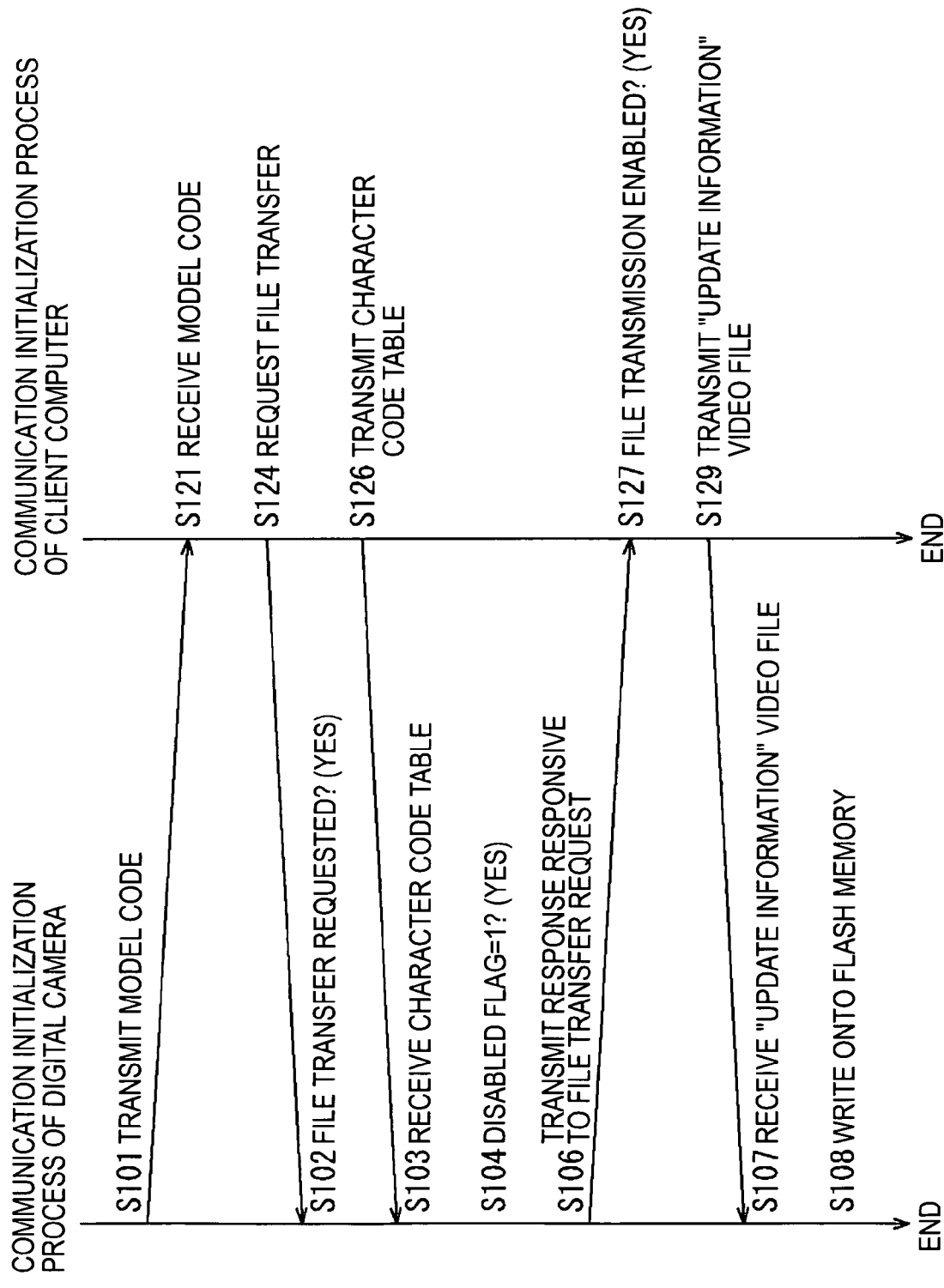
FIG. 21 is an arrow chart illustrating the relationship between the communication initialization process of the digital camera of FIG. 19 and the communication initialization process of the client computer of FIG. 20.
Figure 22:
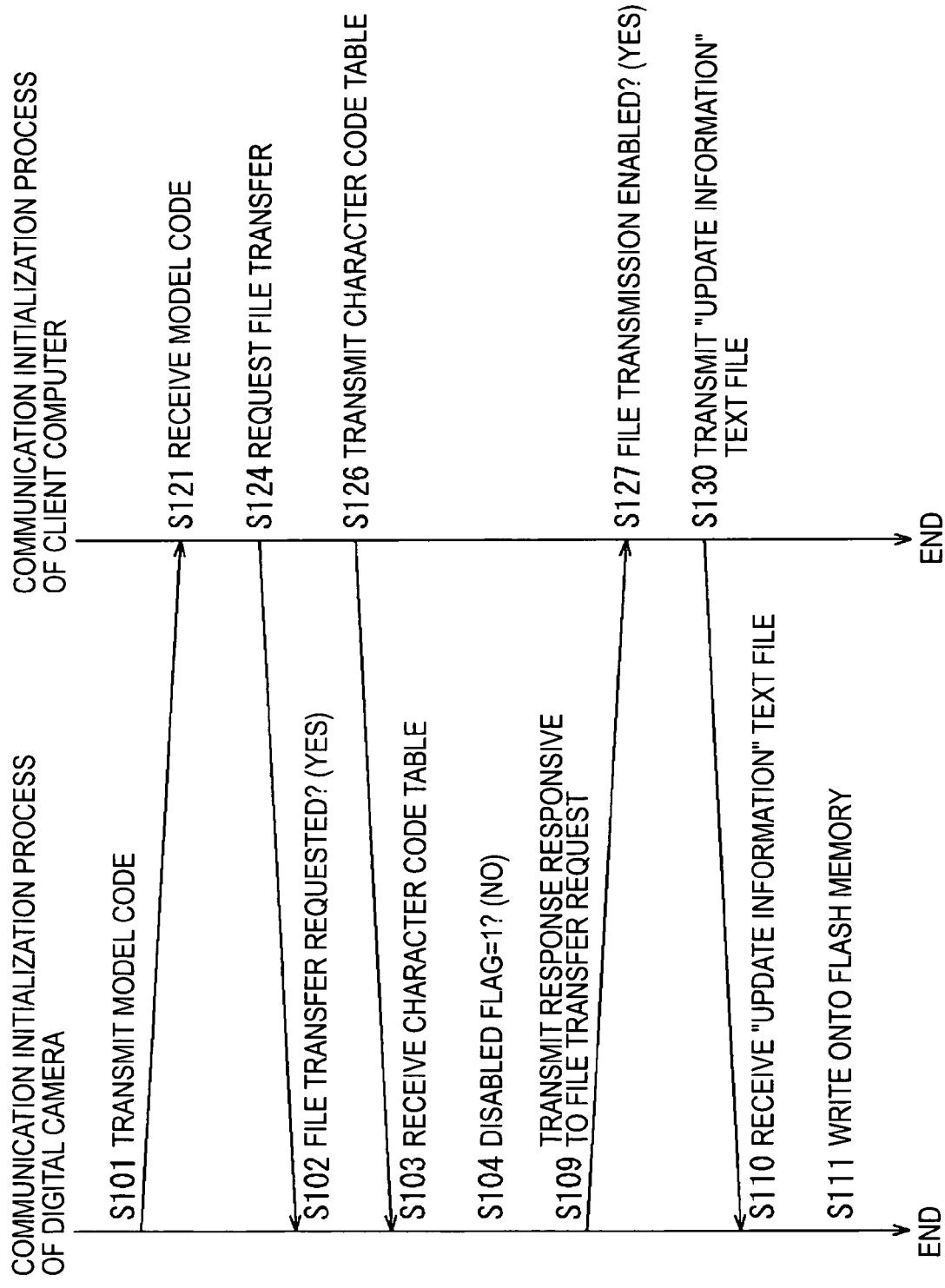
FIG. 22 is an arrow chart illustrating the relationship between the communication initialization process of the digital camera of FIG. 19 and the communication initialization process of the client computer of FIG. 20.

FIG. 19 is the flowchart of the communication initialization process of the digital camera 3, different from the communication initialization process of FIG. 12. FIG. 20 is the flowchart of the communication initialization process of the client computer 2, different from the flowchart of FIG. 12. FIGS. 21 and 22 illustrate the relationship between the communication initialization processes performed by the digital camera 3 and the client computer 2.

The communication initialization process, different from the communication initialization process shown in FIG. 12, is described below with reference to FIGS. 19 through 22.

In the example of FIGS. 19 through 22, the communication initialization process is automatically started when the I/O controller 28 in the client computer 2 of FIG. 1 is electrically connected to the I/O controller 37 in the digital camera 3 via the USB cable. Subsequent to the electrical connection, step S101 is initiated.

In step S101 of FIG. 19, the CPU 39 in the digital camera 3 reads the model code thereof from the flash memory 44, and transmits the model code to the client computer 2 via the I/O controller 37.

In step S121, the CPU 21 in the client computer 2 receives the model code via the I/O controller 28. More specifically, the CPU 21 receives, as the model code of the digital camera 3, "P072JP" listed on the top of the "model code to be transmitted" item of the management table of FIG. 18.

In step S122, the CPU 21 in the client computer 2 searches the storage unit 25 for the corresponding file. Based on the search result, the CPU 21 in the client computer 2 determines whether the update information file corresponding to the model code received in step S121 is present.

If it is determined in step S123 that the update information file is not present, the communication initialization process of the client computer 2 ends. The digital camera 3 determines that the answer to the determination in step S102 is no, thereby ending the communication initialization process thereof. In this way, if the update information file corresponding to the model code of the digital camera 3 is not stored on the storage unit 25, no update information file is transmitted to the digital camera 3.

The model code of the digital camera 3 is "P072JP" herein. All update information files having the names listed in the update information display file item of the management table of FIG. 18 and all update information text files having the names thereof listed in the update information text file item of the management table of FIG. 18 are stored on the storage unit 25 in the client computer 2. More specifically, both the update information display file having the name "p072jp.jpg" corresponding to "P072JP" and the update information text file having the name "p072jp.txt" corresponding to "P072JP" are stored on the storage unit 25. If it is determined in step S123 that the update information file is present, processing proceeds to step S124.

In step S124, the CPU 21 in the client computer 2 transmits a file transfer request to the digital camera 3 via the I/O controller 28.

In step S102, the CPU 39 in the digital camera 3 determines whether the file transfer request has been made.

If the client computer 2 ends the communication initialization process after determining that the answer to the determination in step S123 is no, the digital camera 3 determines in step S102 that the file transfer request has not been made. The communication initialization process of the digital camera 3 also ends.

If the client computer 2 transmits the file transfer request in step S124 after determining that the answer to the determination in step S123 is yes, the CPU 39 in the digital camera 3 receives the file transfer request via the I/O controller 37, and then determines in step S102 that the file transfer request has been made. Processing proceeds to step S103.

In step S125, the CPU 21 in the client computer 2 reads, from the storage unit 25, the update information file corresponding to the model code received in step S121, namely, the update information file having the name "p072jp.txt", and generates a table of the codes of the symbols (text) used in the text file. Such a table is hereinafter referred to as character code table, and the process in step S125 is referred to as a character code production process. The character code production process will be described in more detail later with reference to a flowchart of FIG. 23.

In step S126, the CPU 21 in the client computer 2 transmits the character code table (data) from the I/O controller 28 to the digital camera 3.

In step S103, the CPU 39 in the digital camera 3 receives the character code table via the I/O controller 37, and proceeds to step S104.

In step S104, the CPU 39 in the digital camera 3 references the character code table, thereby determining whether the update information can be displayed with only the character data stored on the flash memory 44. If the CPU 39 in the digital camera 3 determines that the update information cannot be correctly (at least partly) displayed with only the character data stored on the flash memory 44, in other words, determines that at least one symbol that cannot be described by the digital camera 3 is contained in the update information file currently being transmitted by the client computer 2, the CPU 39 sets a display disabled flag indicating display disabled (display disabled flag=1). In contrast, if the CPU 39 in the digital camera 3 determines that the update information can be displayed with only the character data stored on the flash memory 44, in other words, determines that any symbol that cannot be described by the digital camera 3 is not contained in the update information file currently being transmitted by the client computer 2, the CPU 39 clears the display flag (display disabled flag=0). The process in step S104 is hereinafter referred to as a character code table comparison process. The character code table comparison process will be described in more detail later with reference to a flowchart of FIG. 24.

In step S105, the CPU 39 in the digital camera 3 determines whether the display disabled flag is 1 or not.

If it is determined in step S105 that the display disabled flag=1, processing proceeds to step S106.

In step S106, the CPU 39 in the digital camera 3 transmits a reply "video file reception process to be performed" to the client computer 2 via the I/O controller 37 in response to the file transfer request.

In step S127, the CPU 21 in the client computer 2 determines whether the file transmission is possible.

If the digital camera 3 is in trouble (not shown in FIGS. 19-22), a reply "file reception process not to be performed" may be transmitted in response to the file transfer request and the digital camera 3 may end the communication initialization process, or the digital camera 3 ends the communication initialization process without transmitting the reply. In such a case, the CPU 21 in the client computer 2 determines in step S127 that file transmission is not possible, and ends the communication initialization process.

In this case, since the reply "file reception process to be performed" is transmitted from the digital camera 3 in step S106, the CPU 21 in the client computer 2 receives the reply via the I/O controller 28, determines that the file transmission is enabled in step S127, and proceeds to step S128.

In step S128, the CPU 21 in the client computer 2 determines whether the transmitted file is a text file.

In this case, the reply "the video file reception process to be performed" is received, and it is determined in step S128 that the transmitted file is not a text file. Processing proceeds to step S129.

In step S129, the CPU 21 in the client computer 2 reads, from the storage unit 25, the update information file corresponding to the model code of the digital camera 3 received in step S121, namely, the update information file having the name "p072jp.jpg" listed in the management table of FIG. 18, and transmits the update information file to the digital camera 3 via the I/O controller 28. In this way, the communication initialization process of the client computer 2 ends.

The CPU 39 in the digital camera 3 receives the update information file via the I/O controller 37 in step S107 of FIG. 19 and causes the flash memory 44 to store the update information file in step S108. The communication initialization process of the digital camera 3 thus ends.

The series of process steps subsequent to the determination in step S105 that the display disabled flag is 1 has been described. The series of process steps is shown with reference to an arrow chart of FIG. 21.

The series of process steps subsequent to the determination in step S105 that the display disabled flag is not 1, namely, the display disabled flag is 0, is described below. This series of process steps is shown in an arrow chart of FIG. 22.

In this case, processing proceeds to step S109. In step S109, the CPU 39 in the digital camera 3 transmits the reply "text file reception process to be performed" to the client computer 2 via the I/O controller 37 in response to the file transfer request.

The client computer 2 receives the reply via the I/O controller 28, determines in step S127 that file transmission is possible, determines in step S128 the transmitted file is a text file, and then proceeds to step S130.

In step S130, the CPU 21 in the client computer 2 reads, from the storage unit 25, the update information text file corresponding to the model code of the digital camera 3 received in step S121, namely, the update information text file having the name "p072jp.txt" listed in the management table of FIG. 18. The CPU 21 transmits the update information text file to the digital camera 3 via the I/O controller 28. The communication initialization process of the client computer 2 thus ends.

The CPU 39 in the digital camera 3 receives the update information text file via the I/O controller 37 in step S110, and stores the update information text file on the flash memory 44. The communication initialization process of the digital camera 3 thus ends.

Each time the user electrically connects the client computer 2 to the digital camera 3 via the USB cable or the like for the purpose of transferring image, the above-described communication initialization process is automatically performed. The update information video file or the update information text file is automatically stored on the flash memory 44 of the digital camera 3. With the help function, the user can cause the update information image D05 of FIG. 11 to be displayed on the LCD panel 46, and visibly recognize the update information by viewing the display area 111.

In this case as well, the digital camera 3 can perform the display content control process discussed with reference to the flowchart of FIGS. 14 through 17. If the update information text file is stored on the flash memory 44 in the digital camera 3, the process of steps Sb through Sd of FIG. 4 is executed as the process in step S76 of FIG. 16.

The character code table production process in step S125 of FIG. 20 is described below with reference to a flowchart of FIG. 23, and the character code table comparison process in step S104 of FIG. 19 is then described below with reference to a flowchart of FIG. 24.

Figure 23:
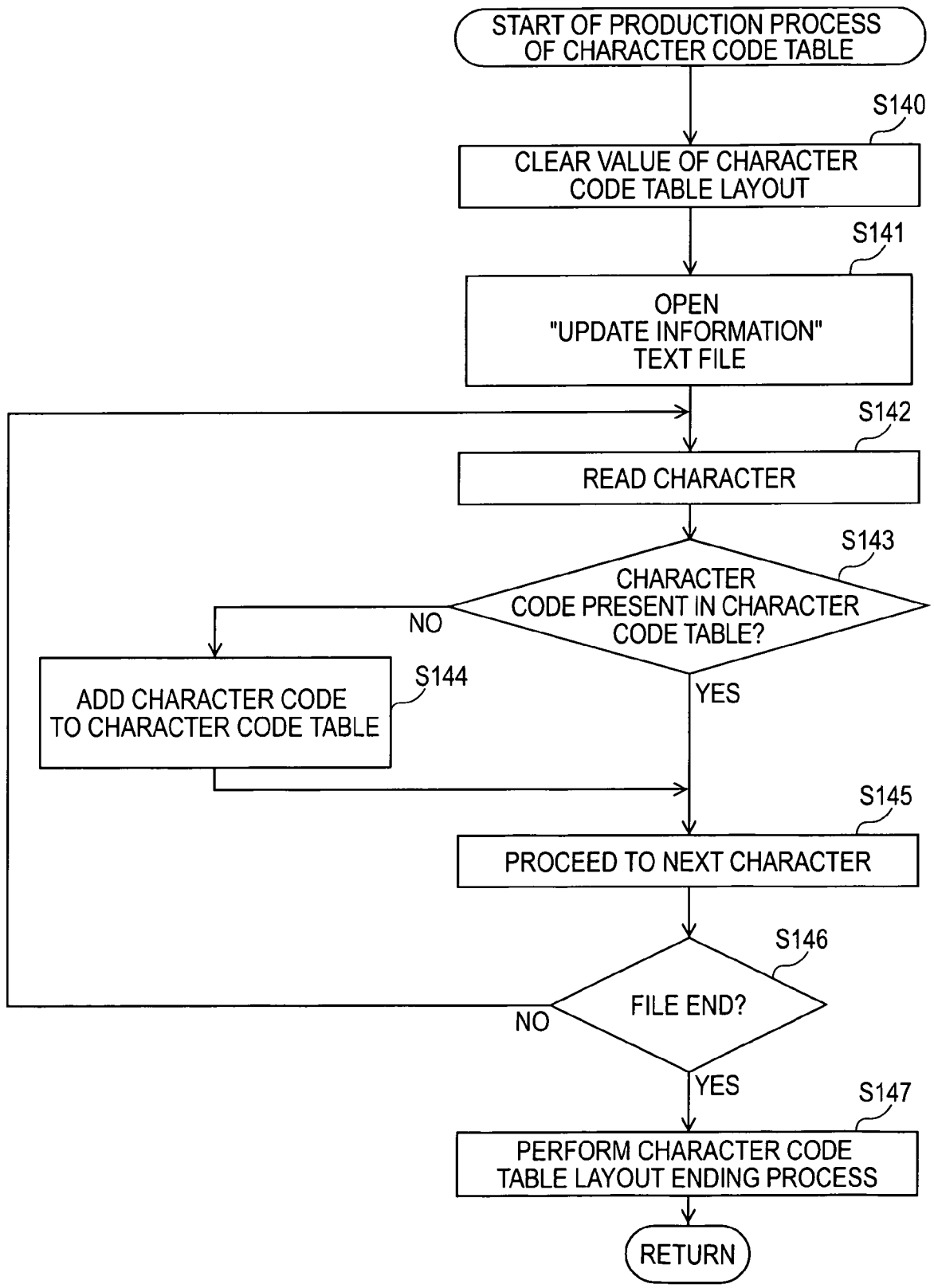
FIG. 23 is a flowchart illustrating in detail a character code table production step in the communication initialization process of the client computer of FIG. 20.
Figure 24:
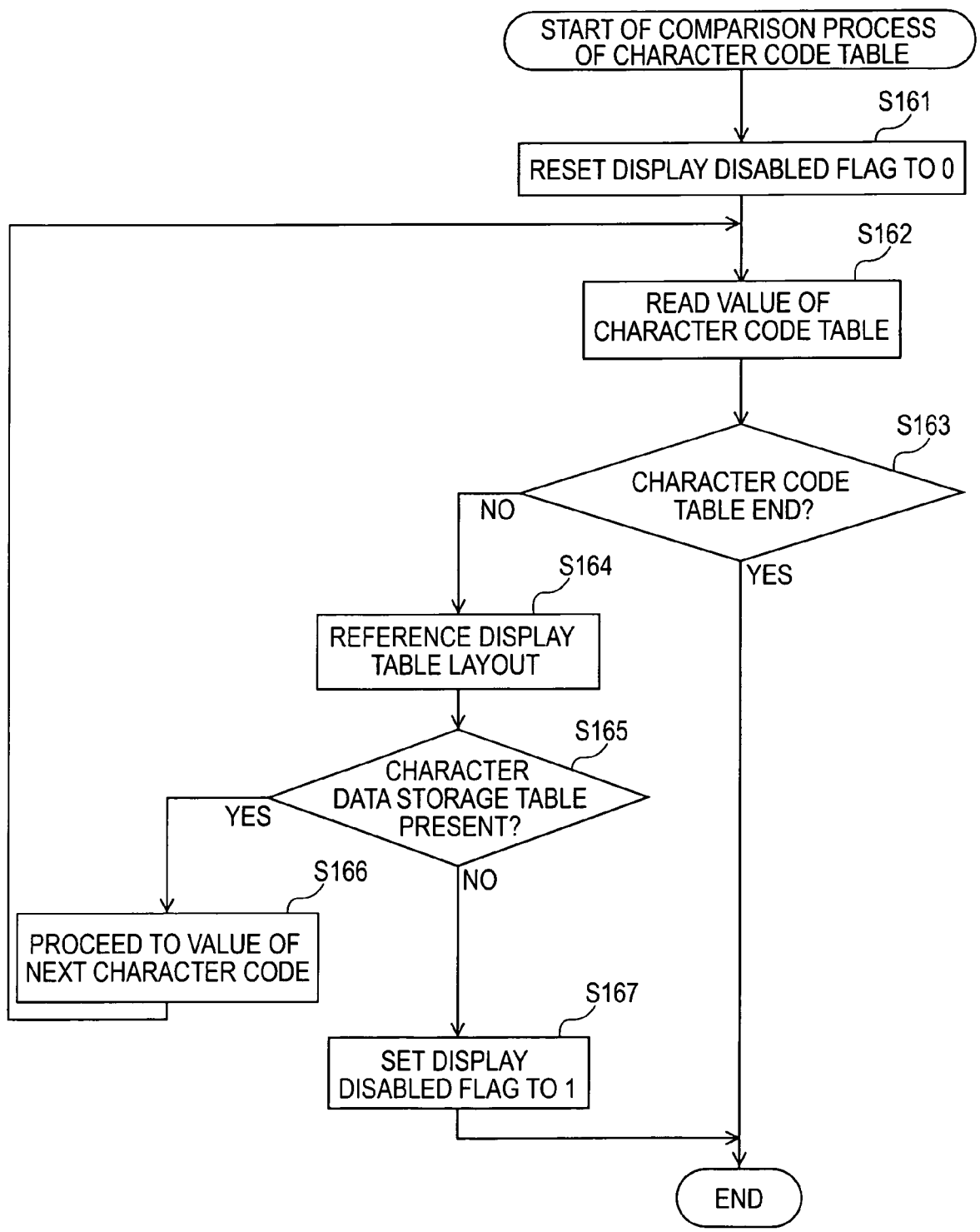
FIG. 24 is a flowchart illustrating in detail a character code table comparison step in the communication initialization process of the digital camera of FIG. 19.

In step S140 of FIG. 23, the CPU 21 in the client computer 2 clears all values of the layout of the character code table.

In step S141, the CPU 21 opens the update information text file corresponding to the model code of the digital camera 3 (a combination of the product model and language) received in step S101 of FIG. 19. In this case, the update information text file having the name "p072jp.txt" in the management table of FIG. 18 is opened.

In step S142, the CPU 21 reads the text file one symbol by one symbol from the start thereof. When current front characters are read, processing proceeds to step S143.

In step S143, the CPU 21 determines whether the character code of the character read in step S142 is present in the character code table.

If it is determined in step S143 that the character code of the character read in step S142 is present in the character code table, processing proceeds to step S145. In other words, the character code of the read character is checked against the current character code table. If the character code is registered in the character code table, processing proceeds to step S145 without performing any process.

If it is determined in step S143 that the character code is not present in the character code table, processing proceeds to step S144. In step S144, the CPU 21 adds (registers), to the character code table, the character code of the character read in step S142. Then, processing proceeds to step S145.

In step S145, the CPU 21 proceeds to a next character to be read after determining that the character read in step S142 is verified.

In step S146, the CPU 21 determines whether the file end is reached.

If it is determined in step S146 that the file end has not been reached, processing returns to step S142 to repeat step S142 and subsequent steps. Steps S142 through S146 are looped to process the symbols one by one until the update information text file opened in step S141 is fully processed.

When the process in step S145 on the final character of the update information text file is completed, it is determined in step S146 that the file end has been reached. Processing then proceeds to step S147.

In step S147, the CPU 21 performs a layout ending process for storing a value indicating the end of the layout (a portion of the storage unit 25) containing the character code table. The character code table production process in step S125 of FIG. 20 is thus completed, and processing proceeds to step S126.

The character code table comparison process in step S104 of FIG. 19 is described below with reference to the flowchart of FIG. 24.

In step S161, the CPU 39 in the digital camera 3 clears the above-described display disabled flag (display disabled flag=0).

In step S162, the CPU 39 reads the value of the character code stored in the data layout of the character code table from the start thereof. When the currently front character code is read, processing proceeds to step S163.

In step S163, the CPU 39 determines whether the value of the character code just read in step S162 is the end of the character code table.

If the value of the character code just read in step S162 equals the value representing the end of the character code table, the CPU 39 determines in step S163 that the end of the character code table has been reached. The character code table comparison process thus ends. The process in step S104 of FIG. 19 thus ends, and processing proceeds to step S105.

If it is determined in step S163 that the end of the character code table has not been reached, processing proceeds to step S164. In step S164, the CPU 39 references the display table layout.

In step S165, the CPU 39 determines whether a character data storage table of the value of the character code read in step S162 is present in the display table layout.

If it is determined in step S165 that no character code storage table is present, namely, the character data of the value of the character code read in step S162 is not stored on the digital camera 3, the CPU 39 sets the display disabled flag (display disabled flag=1) in step S167. The process in step S104 of FIG. 19 ends, and processing proceeds to step S105.

If it is determined in step S165 that a character code storage table is present, namely, the character data of the value of the character code read in step S162 is stored on the digital camera 3, the CPU 39 proceeds to a next character in step S166 after determining that the value of the character code read in step S162 has been verified.

Processing returns to step S162 to repeat step S162 and subsequent steps.

When the character code table comparison process is executed in this way, the display disabled flag becomes information indicating whether the corresponding update information can be displayed on the digital camera 3.

The character code table comparison process of FIG. 19 has been discussed with reference to the flowchart of FIG. 24.

As described above, both the video format file and the text file are managed in the information management server 1 as the update information file of a predetermined product model and a predetermined language. In this case as well, the first through fifth embodiments are equally provided.

If the above-described series of process steps is performed using software, a computer program forming the software is installed from a network or a recording medium onto a computer built in dedicated hardware or a general-purpose computer that can perform a variety of functions with a variety of programs installed thereon.

In the client computer 2 in FIG. 1, the recording medium storing the computer program includes the removable recording medium 30 distributed to a user separate from the apparatus to provide the user with the computer program. The removable recording medium 30 include, for example, a magnetic disk (including a floppy disk), an optical disk (such as compact disk read-only memory (CD-ROM)), or digital versatile disk (DVD)), a magneto-optical disk (such as mini-disk (MD®), and a semiconductor memory. The recording medium further includes the ROM 22 or a hard disk included in the storage unit 25, each of which stores the computer program and is supplied in the apparatus body to the user.

In the digital camera 3 of FIG. 1, the recording medium storing the computer program may include not only the memory card 38 (package medium) supplied separately from the apparatus body to provide the user with the computer program, but also the flash memory 44 storing the computer program and supplied in the apparatus body to the user.

The process steps describing the computer program stored on the recording medium may be performed in the time-series order sequence as previously stated. Alternatively, the process steps may be performed in parallel or separately.

In the context of this specification, the system refers to an entire system including a plurality of apparatuses, and processing units.

The information processing apparatus of embodiments of the present invention for controlling displaying of the product-model unique information is the digital camera 3 in the above discussion. The present invention is not limited to the digital camera 3. The present invention is applicable to any apparatus as long as the apparatus has a function of controlling the displaying of information.

More specifically, the present invention is applicable to an information processing apparatus that can directly communicate with the information management server 1 of FIG. 1 via the network 4. Such an information processing apparatus is hereinafter referred to as a network-based apparatus while the digital camera 3 is hereinafter referred to as a non-network-based information processing apparatus. For example, the present invention is applicable to a mobile telephone in addition to a computer such as the client computer 2. In this case, the information processing apparatus can directly retrieve a file containing product-model unique information from the information management server 1.

The first through fifth advantages are enjoyed regardless of the network-based information processing apparatus or the non-network-based information processing apparatus. However, the effectiveness of the advantages is particularly high on the non-network-based information processing apparatus. Besides the technique provided by embodiments of the present invention, some known techniques that allow a commercial product itself to present product-model unique information are available. It is thus not essential to apply the technique of the present invention to the network-based information processing apparatus. The non-network-based information processing apparatuses are subject to limitations that a networking ability is not available and that built-in character data is limited. Even if the known technique is directly applied, the non-network-based information processing apparatus cannot accurately present the product-model unique information thereof. In practice, there has been no technique available that allows the non-network-based information processing apparatus to present the product-model unique information thereof. Such a technique is provided by the present invention. The known art is subject to limitations, and not applicable to the non-network-based information processing apparatus. In contrast, the technique provided by the present invention is not subject to limitations in applications. The present invention is applicable to a non-network-based information processing apparatus that has no networking ability and has limited character data volume.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for communicating with an other information processing apparatus that stores model-based product model information relating to a predetermined product model, the information processing apparatus comprising:
a first storage area configured to store a model code uniquely identifying the product model of the information processing apparatus;

a second storage area configured to store product model information including a written description relating to the model code of the information processing apparatus;

a connector configured to connect the information processing apparatus with the other information processing apparatus; and a communication controller configured to control communication between the information processing apparatus and the other information processing apparatus as a connection destination of the connector, the communication controller configured to start a communication initialization process as a pre-operation for the communication at the discretion of the communication controller when the connector connects the information processing apparatus with the other information processing apparatus, as at least a portion of the communication initialization process, controlling transmission of the model code stored in the first storage from the information processing apparatus to the other information processing apparatus, and controlling the information processing apparatus in reception of the product model information and then storage of the product model information in the second storage if the other information processing apparatus has identified the product model of the information processing apparatus based on the model code, and has transmitted, to the information processing apparatus, the product model information relating to the identified product model; and an indication controller configured to automatically provide the product model information stored in the second storage to a user, after the execution of the communication initialization process.

2. The information processing apparatus according to claim 1, wherein:

the other information processing apparatus stores language-based product model information per piece of model-based product information;

the model code stored in the first storage contains information relating to a language set in the information processing apparatus; and the communication controller controls the information processing apparatus in the reception of the product model information and then the storage of the received product model information in the second storage if the other information processing apparatus has identified the product model of the information processing apparatus based on the model code, and the language set in the information processing apparatus, and has transmitted to the information processing apparatus the product model information in the identified language out of the language-based product model information relating to the identified product model.

3. An information processing method for an information processing apparatus for communicating with an other information processing apparatus that stores model-based product model information relating to a predetermined product model, the information processing method including:

storing a model code uniquely identifying the product model of the information processing apparatus in a first storage;

storing product model information including a written description relating to the model code of the information processing apparatus in a second storage; and connecting the information processing apparatus with the other information processing apparatus by a connector, the method comprising:

executing a communication initialization process as a pre-operation before communication is performed between the information processing apparatus and the other information processing apparatus connected to the information processing apparatus via the connector, the communication initialization process being started at the discretion of the information processing apparatus when the connector has connected the information processing apparatus to the other information processing apparatus;

controlling the information processing apparatus in transmission of the model code stored in the first storage to the other information processing apparatus;

controlling the information processing apparatus in reception of the product model information and then storage of the product model information in the second storage if the other information processing apparatus has identified the product model of the information processing apparatus based on the model code, and has transmitted, to the information processing apparatus, the product model information relating to the identified product model; and automatically providing the product model information stored in the second storage to a user, after the execution of the communication initialization process.

4. A computer readable storage medium encoded with a program for causing a computer to execute a method for controlling an apparatus for communicating with an other apparatus that stores model-based product model information relating to a predetermined product model, the method including:

storing a model code uniquely identifying the product model of the apparatus in a first storage;

storing product model information including a written description relating to the model code of the apparatus in a second storage; and connecting the apparatus with the other apparatus by a connector;

executing a communication initialization process as a pre-operation before communication is performed between the apparatus and the other apparatus connected to the apparatus via the connector, the communication initialization process being started at the discretion of the apparatus when the connector has connected the apparatus to the other apparatus;

controlling the apparatus in transmission of the model code stored in the first storage to the other apparatus;

controlling the apparatus in reception of the product model information and then storage of the product model information in the second storage if the other apparatus has identified the product model of the apparatus based on the model code, and has transmitted, to the apparatus, the product model information relating to the identified product model; and automatically providing the product model information stored in the second storage to a user, after the execution of the communication initialization process.

* * * * *